US010864742B2

(12) United States Patent
Miyazawa

(10) Patent No.: US 10,864,742 B2
(45) Date of Patent: Dec. 15, 2020

(54) INFORMATION-PROCESSING APPARATUS CAPABLE OF GENERATING SCREEN DATA REPRESENTING SETTINGS SCREEN ON WHICH REFERENCE VALUE FOR INDEX VALUE IS INPUTTED

(71) Applicant: BROTHER KOGYO KABUSHIKI KAISHA, Nagoya (JP)

(72) Inventor: Masafumi Miyazawa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/292,649

(22) Filed: Mar. 5, 2019

(65) Prior Publication Data
US 2019/0275803 A1   Sep. 12, 2019

(30) Foreign Application Priority Data

Mar. 6, 2018   (JP) .................................. 2018-040244

(51) Int. Cl.
*B41J 2/175* (2006.01)
*H04N 1/00* (2006.01)
*G03G 15/00* (2006.01)

(52) U.S. Cl.
CPC ........... *B41J 2/17566* (2013.01); *B41J 2/175* (2013.01); *B41J 2/17513* (2013.01); *B41J 2/17546* (2013.01); *H04N 1/00344* (2013.01); *B41J 2002/17573* (2013.01); *B41J 2002/17579* (2013.01); *G03G 15/556* (2013.01)

(58) Field of Classification Search
CPC .... B41J 2/17566; B41J 2/17513; B41J 2/175; B41J 2/17546; B41J 2002/17573; B41J 2002/17579; H04N 1/00344
See application file for complete search history.

(56) References Cited

FOREIGN PATENT DOCUMENTS

JP   2003-15477 A      1/2003
JP   2004114430 A  *   4/2004

OTHER PUBLICATIONS

IP.com search (Year: 2020).*
Machine Translation of JP 2004-114430 A "Inkjet printer control method involves calculating ink consumption by multiplying unit flow rate of ink, with ink discharge count amount", Minowa, M, Apr. 14, 2004, Seiko Epson Corp, Paragraphs 0006-0007, 0035-0036 (Year: 2004).*

* cited by examiner

*Primary Examiner* — Lisa Solomon
(74) *Attorney, Agent, or Firm* — Merchant & Gould P.C.

(57) ABSTRACT

An information-processing apparatus for managing a print executing unit includes a controller configured to: generate screen data representing a settings screen and output the generated screen data. The settings screen contains: an indication of a specific range of possible values for an index value concerning a total residual quantity of: a residual quantity of printing agent in the print executing unit; and a residual quantity of printing agent in a cartridge; an indication of a value designated from the specific range as a reference value for the index value; and an indication of a boundary value within the specific range. The boundary value corresponds to the total residual quantity at the time of transition from a state where the printing agent remains in both the cartridge and the print executing unit to a state where the printing agent vanishes from the cartridge but remains in the print executing unit.

11 Claims, 14 Drawing Sheets

FIRST STORAGE STATE S1

SECOND STORAGE STATE S2

FIG. 4
FIRST EMBODIMENT

MANAGEMENT DATABASE PD

| | SERIAL NUMBER | MODEL NAME | IP ADDRESS | ACQUIRED STATUS | DETERMINED STATUS | REPLACEMENT COUNT | INK SUPPLY SYSTEM | INITIAL INK VOLUME IV | BOUNDARY INK VOLUME BV | RESIDUAL INK PERCENTAGE IR | REFERENCE RESIDUAL PERCENTAGE TR |
|---|---|---|---|---|---|---|---|---|---|---|---|
| EN1 | AAABBB | MDL_200 | IP_A | NORMAL | | 2 | DOUBLE | 1000 | 200 | 40 | |
| EN2 | CCCDDD | MDL_250 | IP_B | NORMAL | LOW | 3 | DOUBLE | 2000 | 100 | 25 | 30 |
| EN3 | GGGHHH | MDL_500 | IP_C | LOW | LOW | 3 | SINGLE | 4000 | | 5 | 20 |

FIRST EMBODIMENT

FIG. 6

| | MANAGEMENT LIST | | | ML |
|---|---|---|---|---|
| | SERIAL NUMBER | MODEL NAME | IP ADDRESS | STATUS |
| L1 | AAABBB | MDL_200 | IP_A | NORMAL |
| L2 | CCCDDD | MDL_250 | IP_B | NORMAL |
| L3 | GGGHHH | MDL_500 | IP_C | LOW |

CS

SW
DELETION
UPDATING
REFERENCE VALUE SETTING

UP ↕ DOWN

FIRST EMBODIMENT

FIRST EMBODIMENT

FIRST EMBODIMENT

FIG. 11
SECOND EMBODIMENT

MANAGEMENT DATABASE PD2

| SERIAL NUMBER | ACQUIRED STATUS | DETERMINED STATUS | REPLACEMENT COUNT | REPLACEMENT DAY | INK SUPPLY SYSTEM | INITIAL INK VOLUME IV | BOUNDARY INK VOLUME BV | BOUNDARY NUMBER OF PRINTING DAYS BD | RESIDUAL INK PERCENTAGE IR | REFERENCE NUMBER OF DAYS TD |
|---|---|---|---|---|---|---|---|---|---|---|
| AAABBB | NORMAL | | 2 | 2017/1/21 | DOUBLE | 6000 | 200 | TWO DAYS | 40 | |
| CCCDDD | NORMAL | LOW | 3 | 2017/3/24 | DOUBLE | 4000 | 200 | TWO DAYS | 25 | THREE DAYS |
| GGGHHH | LOW | LOW | 3 | 2017/4/12 | SINGLE | 4000 | | | 5 | TWO DAYS |

EN1b / EN2b / EN3b

INFORMATION-PROCESSING APPARATUS CAPABLE OF GENERATING SCREEN DATA REPRESENTING SETTINGS SCREEN ON WHICH REFERENCE VALUE FOR INDEX VALUE IS INPUTTED

CROSS REFERENCE TO RELATED APPLICATION

This application claims priority from Japanese Patent Application No. 2018-040244 filed Mar. 6, 2018. The entire content of the priority application is incorporated herein by reference.

TECHNICAL FIELD

The present disclosure relates to an information-processing apparatus for managing a print executing unit that executes printing operations using a printing agent.

BACKGROUND

There has been known a conventional technique in which an image-forming device transmits an order request signal to a service center when the quantity of a developing agent in the image-forming device has fallen to a prescribed value or below.

SUMMARY

However, if this prescribed value in the conventional technique is not set properly, the image-forming device may not transmit the order request signal at a suitable timing. Accordingly, it is desirable to set a suitable reference value (such as the prescribed value described above) for determining whether a replenishment condition for replenishing a printing agent has been met.

In view of the foregoing, it is an object of the present disclosure is to provide a technique in which a suitable reference value for determining whether a replenishment condition has been met can be set.

In order to attain the above and other objects, according to one aspect, the present disclosure provides an information-processing apparatus for managing a print executing unit. The print executing unit includes: an attachment portion to which a cartridge storing printing agent is attachable; a container for receiving the printing agent from the cartridge attached to the attachment portion and storing the received printing agent; and a printing mechanism configured to perform printing operations using the printing agent stored in the container. The information-processing apparatus includes a controller configured to perform: (a) generating screen data representing a settings screen, the settings screen being for setting a reference value on the basis of a user instruction, the reference value and an index value for a total residual quantity being compared with each other to determine whether a replenishment condition is met, the total residual quantity being a total quantity of a first residual quantity and a second residual quantity, the first residual quantity being a quantity of printing agent remaining in the cartridge, the second residual quantity being a quantity of printing agent remaining in the container, a notification triggering replenishment of the print executing unit with printing agent is made when the replenishment condition is met; and (b) outputting the generated screen data. The settings screen includes: an indication of a specific range of possible values for the index value; an indication of a value designated from the specific range as the reference value by the user instruction; and an indication of a boundary value, the boundary value being a value within the specific range and corresponding to a boundary quantity. The boundary quantity is the total residual quantity at a time of transition from a first state to a second state. The first state is a state in which the printing agent remains both in the cartridge and in the container. The second state is a state in which the printing agent vanishes from the cartridge but remains in the container.

According to another aspect, the present disclosure provides an information-processing apparatus for managing a print executing unit. The print executing unit includes: an attachment portion to which a cartridge storing printing agent is attachable; a container for receiving the printing agent from the cartridge attached to the attachment portion and storing the received printing agent; and a printing mechanism configured to perform printing operations using the printing agent stored in the container. The information-processing apparatus includes a controller configured to perform: (a) generating screen data representing a settings screen, the settings screen being for setting a reference value on the basis of a user instruction, the user instruction being inputted by a user designation operation on the settings screen, the user designation operation being a user operation to designate a value as the reference value, the reference value and an index value for a total residual quantity being compared with each other to determine whether a replenishment condition is met, the total residual quantity being a total quantity of a first residual quantity and a second residual quantity, the first residual quantity being a quantity of printing agent remaining in the cartridge, the second residual quantity being a quantity of printing agent remaining in the container, a notification triggering replenishment of the print executing unit with printing agent being made when the replenishment condition is met, the settings screen including an indication of a specific range of possible values for the index value and an indication of a value designated from the specific range as the reference value by the user instruction; (b) outputting the generated screen data; (c) determining whether the user designation operation is an inappropriate operation, the inappropriate operation being a user operation to designate as the reference value a value from a prohibited range included in the specific range, the prohibited range corresponding to a residual quantity range ranging less than a boundary quantity, the boundary value being a value within the specific range and corresponding to a boundary quantity, the boundary quantity being the total residual quantity at a time of transition from a first state to a second state, the first state being a state in which the printing agent remains both in the cartridge and in the container, the second state being a state in which the printing agent vanishes from the cartridge but remains in the container; (d) accepting, in response to determining that the user designation operation is not the inappropriate operation, input of the user instruction by the user designation operation; and (e) refusing, in response to determining that the user designation operation is the inappropriate instruction, input of the user instruction by the user designation operation.

According to still another aspect, the present disclosure provides a non-transitory computer-readable storage medium storing a set of program instructions for an information-processing apparatus for managing a print executing unit. The print executing unit includes: an attachment portion to which a cartridge storing printing agent is attachable; a container for receiving the printing agent from the cartridge attached to the attachment portion and storing the received printing agent; and a printing mechanism configured to perform printing operations using the printing agent stored in the container. The information-processing apparatus includes a processor. The set of program instructions, when executed by the processor, causes the information-processing apparatus to perform: (a) generating screen data representing a settings screen, the settings screen being for setting a reference value on the basis of a user instruction, the reference value and an index value for a total residual quantity being compared with each other to determine whether a replenishment condition is met, the total residual quantity being a total quantity of a first residual quantity and a second residual quantity, the first residual quantity being a quantity of printing agent remaining in the cartridge, the second residual quantity being a quantity of printing agent remaining in the container, a notification triggering replenishment of the print executing unit with printing agent being made when the replenishment condition is met; and (b) outputting the generated screen data. The settings screen includes: an indication of a specific range of possible values for the index value; an indication of a value designated from the specific range as the reference value by the user instruction; and an indication of a boundary value, the boundary value being a value within the specific range and corresponding to a boundary quantity. The boundary quantity is the total residual quantity at a time of transition from a first state to a second state. The first state is a state in which the printing agent remains both in the cartridge and in the container. The second state is a state in which the printing agent vanishes from the cartridge but remains in the container.

According to still another aspect, the present disclosure provides a non-transitory computer-readable storage medium storing a set of program instructions for an information-processing apparatus for managing a print executing unit. The print executing unit includes: an attachment portion to which a cartridge storing printing agent is attachable; a container for receiving the printing agent from the cartridge attached to the attachment portion and storing the received printing agent; and a printing mechanism configured to perform printing operations using the printing agent stored in the container. The information-processing apparatus includes a processor. The set of program instructions, when executed by the processor, causes the information-processing apparatus to perform: (a) generating screen data representing a settings screen, the settings screen being for setting a reference value on the basis of a user instruction, the user instruction being inputted by a user designation operation on the settings screen, the user designation operation being a user operation to designate a value as the reference value, the reference value and an index value for a total residual quantity being compared with each other to determine whether a replenishment condition is met, the total residual quantity being a total quantity of a first residual quantity and a second residual quantity, the first residual quantity being a quantity of printing agent remaining in the cartridge, the second residual quantity being a quantity of printing agent remaining in the container, a notification triggering replenishment of the print executing unit with printing agent being made when the replenishment condition is met, the settings screen including an indication of a specific range of possible values for the index value and an indication of a value designated from the specific range as the reference value by the user instruction; (b) outputting the generated screen data; (c) determining whether the user designation operation is an inappropriate operation, the inappropriate operation being a user operation to designate as the reference value a value from a prohibited range included in the specific range, the prohibited range corresponding to a residual quantity range ranging less than a boundary quantity, the boundary value being a value within the specific range and corresponding to a boundary quantity, the boundary quantity being the total residual quantity at a time of transition from a first state to a second state, the first state being a state in which the printing agent remains both in the cartridge and in the container, the second state being a state in which the printing agent vanishes from the cartridge but remains in the container; (d) accepting, in response to determining that the user designation operation is not the inappropriate operation, input of the user instruction by the user designation operation; and (e) refusing, in response to determining that the user designation operation is the inappropriate instruction, input of the user instruction by the user designation operation.

BRIEF DESCRIPTION OF THE DRAWINGS

The particular features and advantages of the embodiment(s) as well as other objects will become apparent from the following description taken in connection with the accompanying drawings, in which:

FIG. 4 illustrates an example of a management database PD in the management server 300 according to the first embodiment of the present disclosure;

FIG. 6 illustrates an example of a management list ML displayed by the management server 300 according to the first embodiment of the present disclosure;

FIG. 11 illustrates an example of a management database PD2 in the management server according to the second embodiment;

DETAILED DESCRIPTION

A. First Embodiment

<A-1. Structure of a System 1000>

Figure 1:
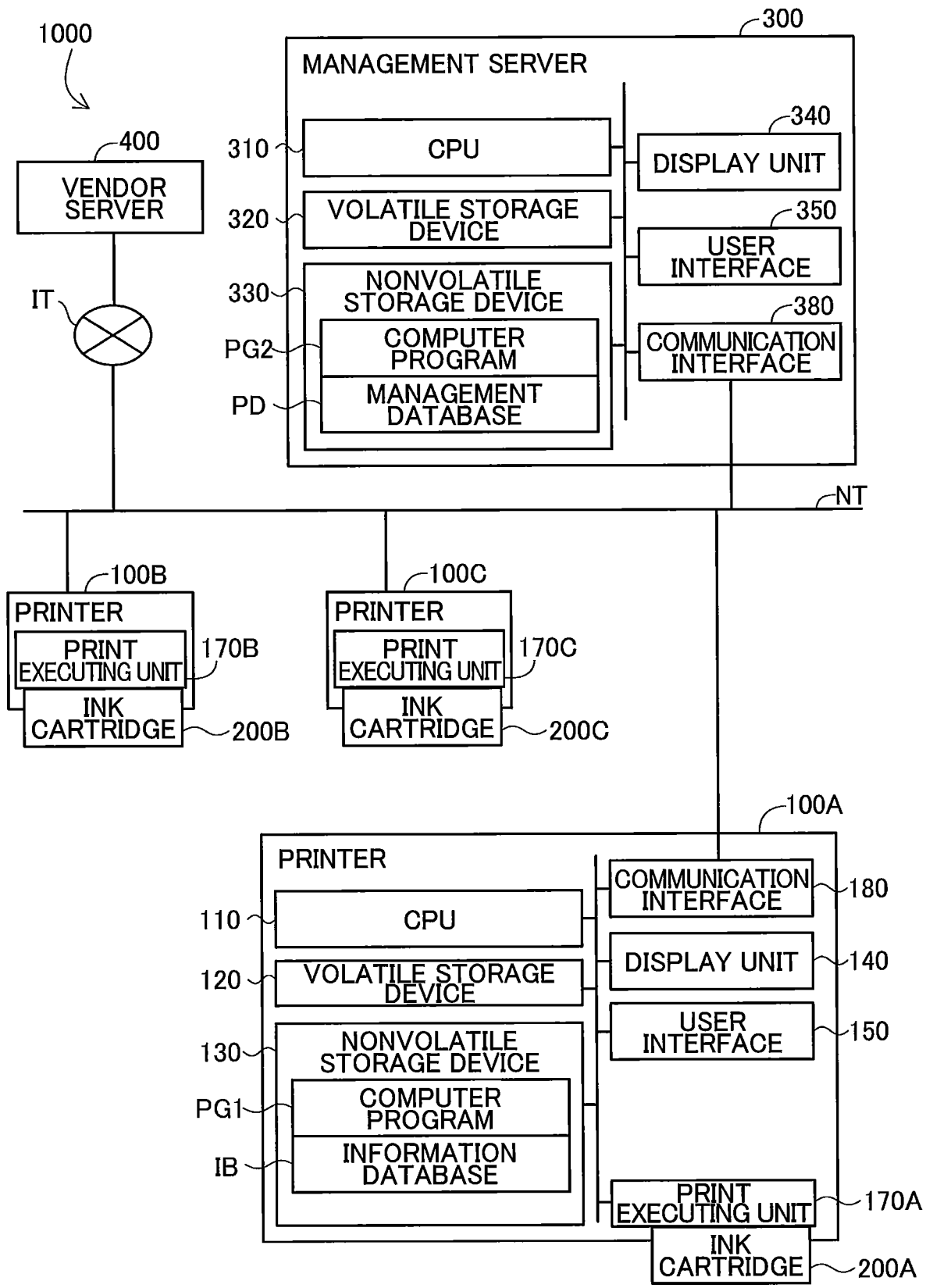
FIG. 1 is a block diagram illustrating a structure of a system 1000 including a management server 300 according to a first embodiment of the present disclosure.

FIG. 1 is a block diagram illustrating the structure of a system 1000. The system 1000 includes printers 100A, 100B, and 100C; a management server 300; and a vendor server 400. The management server 300 is an example of an information-processing apparatus according to a first embodiment of the present disclosure.

The printers 100A, 100B, and 100C and the management server 300 are connected to a local area network NT and can communicate with each other over the local area network NT. The vendor server 400 is a server belonging to the operator of the system 1000 and is connected to the Internet IT, for example. The vendor server 400 receives order notifications from the management server 300 in a management process described later. The printer 100A is an example of the claimed "first printer." The printer 100B is an example of the claimed "second printer."

The printer 100A includes a CPU 110 as a controller of the printer 100A; a volatile storage device 120, such as DRAM; a nonvolatile storage device 130, such as a hard disk drive or flash memory; a display unit 140, such as a liquid crystal display that displays images; a user interface 150, such as a touchscreen and buttons designed to acquire operations performed by the user; a print executing unit 170A; and a communication interface 180.

The communication interface 180 is an interface for connecting the printer 100A to the local area network NT. Specifically, the communication interface 180 is a wired interface conforming to Ethernet (registered trademark), or a wireless interface conforming to the Wi-Fi technology (based on the IEEE (Institute of Electrical and Electronics Engineers, Inc.) 802.11 standard or a standard based thereon, such as one of the versions 802.11a, 11b, 11g, and 11n).

The CPU 110 is a processor that performs data processing. The volatile storage device 120 provides a buffer region that temporarily stores various intermediate data generated when the CPU 110 performs processes. The nonvolatile storage device 130 stores a computer program PG1 for controlling the printer, and an information database D3 described later.

In the present embodiment, the computer program PG1 may be pre-stored in the nonvolatile storage device 130 when the printer 100A is manufactured. Alternatively, the computer program PG1 may be made available through download from a server connected to the printer 100A over the Internet IT, or may be provided in a recorded format, such as on a CD-ROM.

By executing the computer program PG1, the CPU 110 executes a printing process for controlling the print executing unit 170A to print images. Also, by executing the computer program PG1, the CPU 110 transmits various printer information related to the printer 100A that is stored in the information database IB to the management server 300 in response to a request from the management server 300.

Figure 2A:
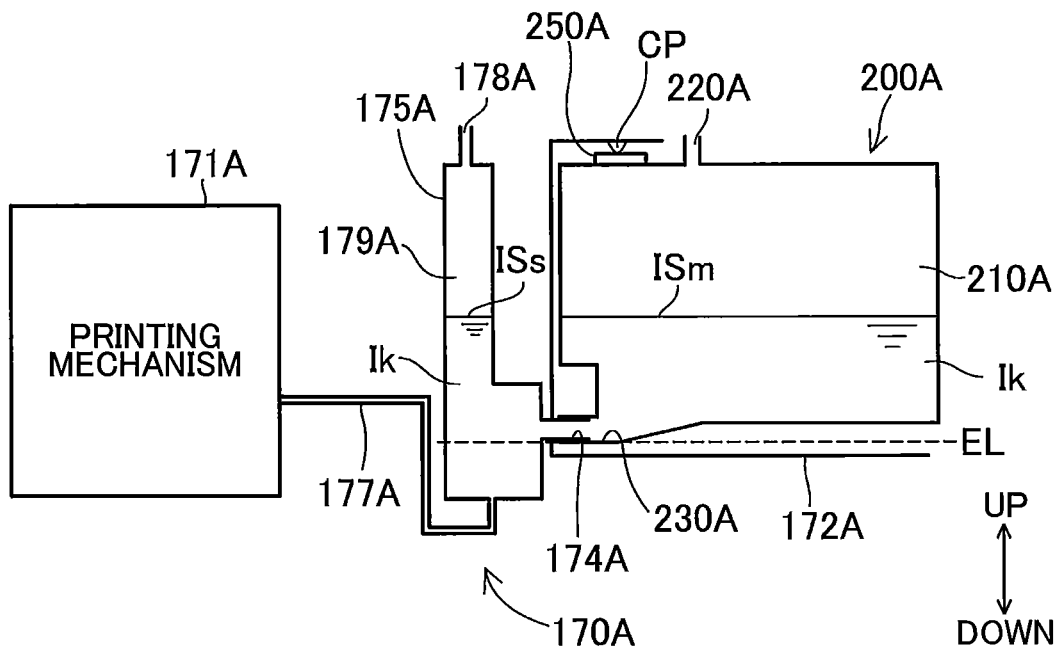
FIG. 2A is a schematic diagram illustrating a structure of a print executing unit 170A, and particularly illustrating the print executing unit 170A in a first storage state.
Figure 2B:
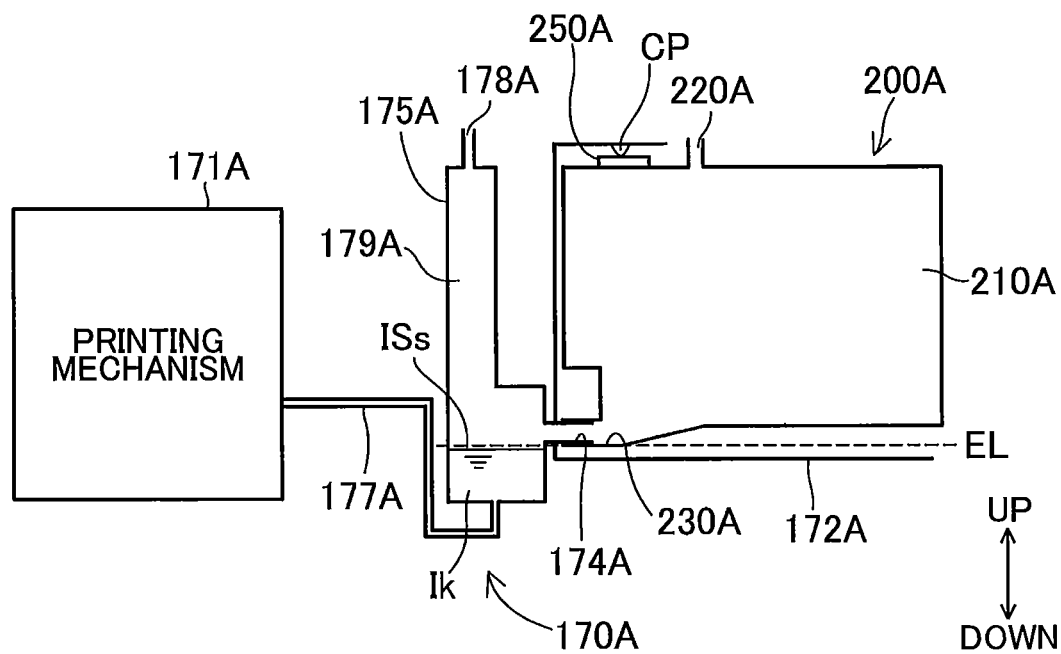
FIG. 2B is a schematic diagram illustrating the structure of the print executing unit 170A, and particularly illustrating the print executing unit 170A in a second storage state.

The print executing unit 170A executes printing operations in accordance with the control by the CPU 110. FIGS. 2A and 2B are schematic diagrams showing the structure of the print executing unit 170A. As shown in FIGS. 2A and 2B, the print executing unit 170A includes a printing mechanism 171A, an attachment portion 172A, an ink supply opening 174A, an intermediate container 175A, and an ink channel section 177A.

The printing mechanism 171A is an inkjet-type printing mechanism configured to print images on paper (a printing medium) using, as a printing agent, ink supplied from an ink cartridge 200A via the intermediate container 175A. In other words, the printing mechanism 171A is configured to perform printing operations using ink Ik (see FIG. 2A) stored in the intermediate container 175A. More specifically, the printing mechanism 171A forms images on paper by ejecting ink onto the paper from nozzles formed in a print head (not shown) to form dots on the paper. In the present embodiment, the printing mechanism 171A is a monochromatic printing mechanism using a single color of ink (black (K), for example).

Formed in the ink cartridge 200A are a main storage chamber 210A for accommodating ink Ik, an air hole 220A, and an ink outlet 230A. The air hole 220A is an opening providing communication between the main storage chamber 210A and the external air. The ink outlet 230A is an opening through which the ink Ik is supplied from the main storage chamber 210A to the print executing unit 170A via the intermediate container 175A. The ink outlet 230A is provided near the bottom (i.e., the lower end in the vertical direction) of the main storage chamber 210A so as to be capable of supplying all of the ink Ik in the main storage chamber 210A into the print executing unit 170A via the intermediate container 175A. The ink cartridge 200A is an example of the claimed "cartridge." The ink Ik is an example of the claimed "printing agent." The main storage chamber 210A is an example of the claimed "first storage chamber."

An integrated circuit (hereinafter called a "chip") 250A is mounted on the outer surface of the ink cartridge 200A. The chip 250A has memory storing various information about the ink cartridge 200A. The information stored in the memory of the chip 250A in the present embodiment includes information specifying an initial ink volume IV that is the quantity of ink Ik accommodated in a new ink cartridge 200A, and identification information (a serial number, for example) for identifying the ink cartridge 200A.

The attachment portion 172A is, for example, a holder to which the ink cartridge 200A is detachably attachable. The ink supply opening 174A communicates with the ink outlet 230A of the ink cartridge 200A attached to the attachment portion 172A. The ink Ik in the main storage chamber 210A is supplied into the print executing unit 170A through the ink supply opening 174A and the intermediate container 175A. The attachment portion 172A has a contact CP that contact an electrode on the chip 250A of the ink cartridge 200A when the ink cartridge 200A is attached to the attachment portion 172A. The printer 100A (the CPU 110) can read information stored in the memory of the chip 250A and write information to the memory through the contact CP.

An auxiliary storage chamber 179A for accommodating the ink Ik and an air hole 178A are formed in the intermediate container 175A. The intermediate container 175A receives the ink Ik from the ink cartridge 200A attached to the attachment portion 172A and stores the received ink Ik in the auxiliary storage chamber 179A. The air hole 178A is an opening providing communication between the auxiliary storage chamber 179A and the external air. The auxiliary storage chamber 179A communicates with the ink supply opening 174A and stores ink supplied from the ink cartridge 200A through the ink supply opening 174A. The intermediate container 175A is an example of the claimed "container." The auxiliary storage chamber 179A is an example of the claimed "second storage chamber."

The upstream end of the ink channel section 177A is connected to the intermediate container 175A near the bottom surface of the auxiliary storage chamber 179A and is in communication with the auxiliary storage chamber 179A. The downstream end of the ink channel section 177A is connected to the print head (not shown) of the printing mechanism 171A. With this configuration, ink Ik in the auxiliary storage chamber 179A is supplied to the printing mechanism 171A through the ink channel section 177A. That is, the intermediate container 175A stores ink Ik received from the ink cartridge 200A attached to the attachment portion 172A and the printing mechanism 171A performs printing operations using the ink Ik stored in the intermediate container 175A.

As is clear from the above description, the intermediate container 175A is disposed along the path of ink Ik flowing from the ink cartridge 200A attached to the attachment portion 172A to the printing mechanism 171A.

This type of ink supply system that is provided with an intermediate container along the flow path of the ink Ik leading from the ink cartridge to the printing mechanism, as in the print executing unit 170A of the printer 100A, will be called a double-chamber supply system.

FIG. 2A depicts the print executing unit 170A in a first storage state S1, while FIG. 2B depicts the print executing unit 170A in a second storage state S2. In the first storage state S1, ink Ik remains both in the ink cartridge 200A (in the main storage chamber 210A) and in the intermediate container 175A (in the auxiliary storage chamber 179A). In the second storage state S2, ink Ik remains in the intermediate container 175A (the auxiliary storage chamber 179A), but no longer remains in the ink cartridge 200A (the main storage chamber 210A). In other words, in the second storage state S2, ink Ik vanishes from the ink cartridge 200A, but remains in the intermediate container 175A. The first storage state S1 is an example of the claimed "first state." The second storage state S2 is an example of the claimed "second state."

The main storage chamber 210A in the ink cartridge 200A communicates with the atmosphere through the air hole 220A, and the auxiliary storage chamber 179A in the intermediate container 175A communicates with the atmosphere through the air hole 178A.

The auxiliary storage chamber 179A of the intermediate container 175A includes a section positioned lower (below in FIGS. 2A and 2B) than the bottom end of the main storage chamber 210A formed in the ink cartridge 200A, and a section positioned higher than the bottom end of the main storage chamber 210A. Thus, when a new ink cartridge 200A is attached to the attachment portion 172A, some of the ink Ik in the ink cartridge 200A transfers from the main storage chamber 210A into the auxiliary storage chamber 179A through the ink supply opening 174A. Consequently, the level ISm of ink Ik in the main storage chamber 210A and the level ISs of ink Ik in the auxiliary storage chamber 179A are adjusted to the same height (see FIG. 2A). The section of the auxiliary storage chamber 179A positioned lower than the bottom end of the main storage chamber 210A is an example of the claimed "specific portion."

As ink Ik is consumed through printing by the printing mechanism 171A, the levels ISm and ISs drop while remaining at the same level as each other. Once the levels ISm and ISs reach a vertical position EL corresponding to the bottom of the main storage chamber 210A (hereinafter called an "empty level EL"), ink Ik no longer remains in the main storage chamber 210A. Hence, the state of the ink Ik shifts from the first storage state S1 in FIG. 2A to the second storage state S2 in FIG. 2B. Here, the state in which ink Ik no longer remains in the main storage chamber 210A of the ink cartridge 200A signifies that ink Ik no longer transfers from the main storage chamber 210A into the auxiliary storage chamber 179A and includes a state in which some ink Ik remains deposited on the inner walls of the main storage chamber 210A.

The printing mechanism 171A can continue to print even after the storage condition of ink Ik has shifted to the second storage state S2, provided that ink Ik remains in the auxiliary storage chamber 179A. If the ink cartridge 200A is replaced with a new ink cartridge after the storage condition has shifted to the second storage state S2, ink Ik will not be wasted since no ink Ik remains in the old ink cartridge 200A being replaced. Hence, the double-chamber supply system is advantageous in that the ink cartridge 200A can be replaced while printing is still possible, without wasting any ink Ik.

In the double-chamber supply system, a liquid level sensor (not shown) is provided in the intermediate container 175A for detecting whether the level ISs of ink Ik in the auxiliary storage chamber 179A has reached the empty level EL. With this arrangement, it can be detected whether ink Ik remains in the ink cartridge 200A.

The liquid level sensor may be configured with a float having a smaller specific density than that of the ink Ik. In this configuration, since the position of the float moves downward after the level ISs reaches the empty level EL, it can be detected by detecting movement of the float that the level ISs has reached the empty level EL. In other words, the liquid level sensor detects whether the storage condition of ink is the first storage state S1 or the second storage state S2. Other methods known in the art may be employed as the liquid level sensor, such as a method of measuring the electrical resistance of the ink Ik. The ink cartridge 200A need not be provided with a liquid level sensor when employing the double-chamber supply system. Accordingly, the double-chamber supply system is also advantageous in that the structure of the ink cartridge 200A can be simplified.

The ink volume corresponding to the boundary between the first storage state S1 and second storage state S2 will be called a boundary ink volume BV. In other words, the boundary ink volume BV is the total residual ink quantity at the time of transition from the first storage state S1 to the second storage state S2. The boundary ink volume BV in the present embodiment may be considered the quantity of ink in the auxiliary storage chamber 179A when the level ISs in the auxiliary storage chamber 179A has dropped to the empty level EL. The boundary ink volume BV may also be considered the maximum ink volume in the second storage state S2. Further, the boundary ink volume BV is equivalent to the capacity of the section of the auxiliary storage chamber 179A positioned below the bottom end of the main storage chamber 210A. The boundary ink volume BV is an example of the claimed "boundary quantity."

The information database IB stores printer information related to the printer 100A. Printer information includes information specifying the serial number and model name, for example. Printer information also includes ink information regarding the ink Ik, and history information about the printing history, for example. The ink information may include the initial ink volume IV for the ink cartridge 200A, the boundary ink volume BV, a replacement count indicating the number of times the ink cartridge 200A has been replaced, and a residual ink percentage IR. The history information is information related to the printing history, such as the number of pages printed within a prescribed period of time, and the total number of pages printed. The ink information is an example of the claimed "printing agent information."

The printer 100A (the CPU 110) maintains the printer information in the information database D3 at the latest information by updating the history information and ink information stored in the information database IB each time a printing operation is executed, for example. The initial ink volume IV may be acquired from the memory on the chip 250A of the ink cartridge 200A, for example. The replacement count is incremented by one each time the identification information for the ink cartridge 200A acquired from the memory of the chip 250A differs from the identification information recorded in the information database IB, for example.

The printer 100B includes a print executing unit 170B (see FIG. 1) that differs from the print executing unit 170A of the printer 100A. The remaining structure of the printer 100B is identical to that of the printer 100A. As with the print executing unit 170A, the print executing unit 170B employs a double-chamber supply system that is provided with an intermediate container along the path of ink Ik flowing from the ink cartridge to the printing mechanism (not shown). However, the capacity of the intermediate container (auxiliary storage chamber) in the print executing unit 170B differs from the capacity of the intermediate container 175A in the print executing unit 170A and, hence, the boundary ink volume BV of the print executing unit 170B differs from that of the print executing unit 170A. Further, an ink cartridge 200B (see FIG. 1) attached to the print executing unit 170B has a different initial ink volume IV from the initial ink volume IV of the ink cartridge 200A.

The printer 100C includes a print executing unit 170C that differs from the print executing unit 170A of the printer 100A. The remaining structure of the printer 100C is identical to that of the printer 100A. Unlike the print executing unit 170A depicted in FIGS. 2A and 2B, the print executing unit 170C employs a single-chamber supply system that is not provide with an intermediate container along the path of the ink Ik flowing from an ink cartridge 200C to the printing mechanism.

Figure 3A:
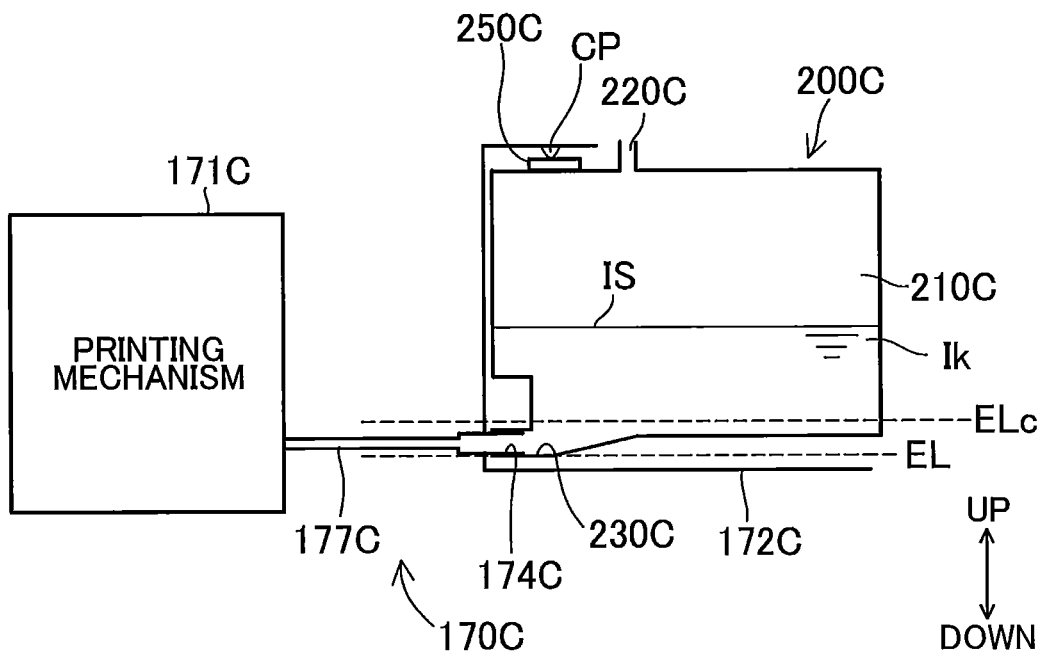
FIG. 3A is a schematic diagram illustrating a structure of a print executing unit 170C.
Figure 3B:
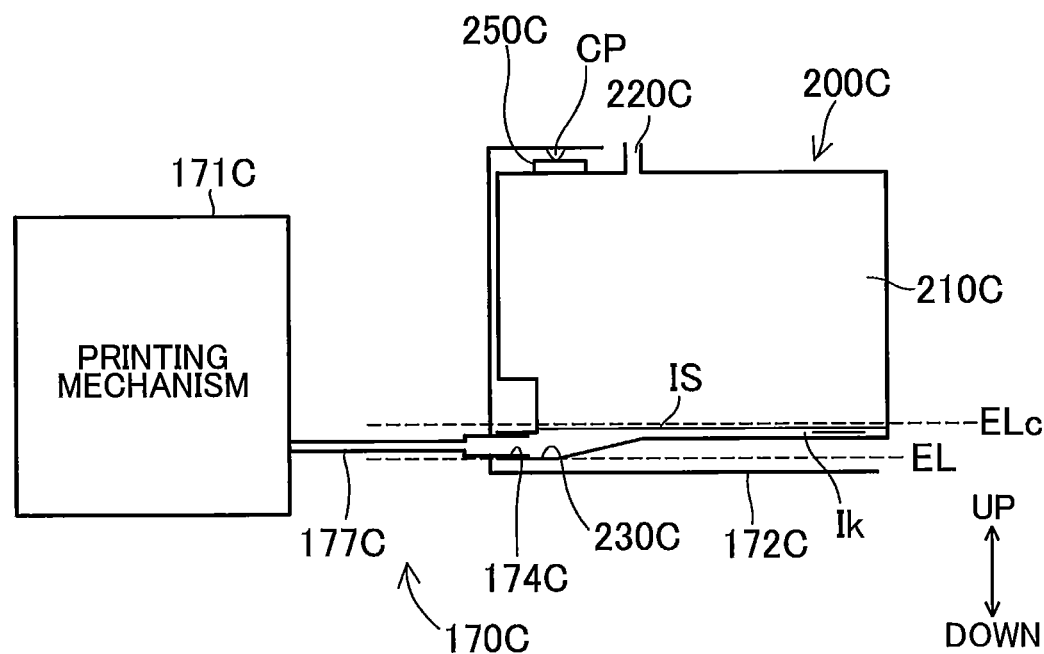
FIG. 3B is a schematic diagram illustrating the structure of the print executing unit 170C, and particularly illustrating a state of stored ink when the level IS of ink Ik in an ink cartridge 200C has reached an empty level ELc.

FIGS. 3A and 3B are schematic diagrams showing the structure of the print executing unit 170C. The print executing unit 170C includes an inkjet-type printing mechanism 171C similar to the printing mechanism 171A, an attachment portion 172C, an ink supply opening 174C, and an ink channel section 177C.

As with the ink cartridge 200A, the ink cartridge 200C has a storage chamber 210C that accommodates ink Ik, an air hole 220C that provides communication between the storage chamber 210C and the external air, and an ink outlet 230C through which ink Ik is supplied to the print executing unit 170C. As with the ink cartridge 200A, a chip 250C is mounted on the outer surface of the ink cartridge 200C.

The attachment portion 172C is, for example, a holder to which the ink cartridge 200C is detachably attachable. The ink supply opening 174C communicates with the ink outlet 230C in the ink cartridge 200C attached to the attachment portion 172C. The upstream end of the ink channel section 177C communicates with the ink supply opening 174C, while the downstream end of the ink channel section 177C is connected to a print head (not shown) in the printing mechanism 171C. With this configuration, ink Ik in the ink cartridge 200C (the storage chamber 210C) is supplied to the printing mechanism 171C through the ink channel section 177C.

In the single-chamber supply system, a liquid level sensor (not shown) is provided in the ink cartridge 200C for detecting whether a level IS of ink Ik in the storage chamber 210C has reached an empty level ELc.

Since the single-chamber supply system does not include the intermediate container provided in the double-chamber supply system, the printing mechanism 171C becomes unable to print prior to the ink cartridge 200C running out of ink Ik. Specifically, the problem of air becoming mixed in with ink Ik supplied to the printing mechanism 171C may occur when the residual quantity of ink Ik in the ink cartridge 200C is slight. Therefore, printing with the printing mechanism 171C must be halted when the residual quantity of ink Ik in the ink cartridge 200C has lowered to a small quantity that may cause a mixture of air.

Therefore, in the single-chamber supply system, the empty level ELc (see FIGS. 3A and 3B) is set above the empty level EL (see FIGS. 2A, 2B, 3A, and 3B) in the ink cartridge 200A. FIG. 3B shows the state of stored ink when the level IS of ink Ik in the ink cartridge 200C has reached the empty level ELc. In this state, a small quantity of ink Ik remains in the ink cartridge 200C (the storage chamber 210C). When using the single-chamber supply system, the ink cartridge 200C is replaced after the level IS of ink Ik in the ink cartridge 200C has reached the empty level ELc.

The management server 300 is a computer owned by the administrator of the printers 100A, 100B, and 100C. The management server 300 is provided with a CPU 310 serving as a controller of the management server 300; a volatile storage device 320, such as DRAM; a nonvolatile storage device 330, such as a hard disk drive or flash memory; a display unit 340, such as a liquid crystal display that displays images; a user interface 350, such as a keyboard and mouse; and a communication interface 380. The management server 300 is an example of the claimed "information-processing apparatus."

The communication interface 380 is connected to the local area network NT. As with the communication interface 180 of the printer 100A, the communication interface 380 is a wired interface conforming with Ethernet (registered trademark), or a wireless interface conforming with Wi-Fi technology or a standard based on this technology.

The CPU 310 is a processor that performs data processes. The volatile storage device 320 provides a buffer region for temporarily storing various intermediate data generated when the CPU 310 performs processes. The nonvolatile storage device 330 stores a computer program PG2, and a management database PD. The CPU 310 is an example of the claimed "controller."

The computer program PG2 is an application program provided in a downloadable format from the vendor server 400, for example. Here, the vendor server 400 is a server provided by the company that manages the system 1000 or the vendor that manufactures the printers 100A, 100B, and 100C. Alternatively, the computer program PG2 may be provided in a recorded format, such as on a CD-ROM, or may be pre-stored in the nonvolatile storage device 330 when the management server 300 is manufactured.

By executing the computer program PG2, the management server 300 (the CPU 310) executes processes (described later) related to management of the printers 100A, 100B, and 100C in the system 1000, such as a management process, a printer information display process, and a reference value setting process.

The management database PD records device information (for example, printer information) collected by the management server 300. FIG. 4 shows an example of the management database PD according to the first embodiment. As shown in FIG. 4, the management database PD includes entries EN1, EN2, and EN3 corresponding to the printers 100A, 100B, and 100C under management.

Entry EN1 that corresponds to the printer 100A includes a plurality of printer information items for the printer 100A, and specifically a serial number, model name, IP address, and ink-related information about the ink Ik. The ink-related information includes information on an acquired status, a determined status, a replacement count, the ink Ik supply system described above, the initial ink volume IV, the boundary ink volume BV, the residual ink percentage IR, and a reference residual percentage TR.

The serial number is identification information used to identify the printer 100A. The model name specifies the model of the printer 100A. The IP address is an address that has been assigned to the printer 100A.

The acquired status and the determined status are information specifying the state of residual ink Ik in the ink cartridge 200A currently attached to the attachment portion 172A. Each of the acquired status and the determined status takes one of the values "normal" and "low".

The acquired status is information acquired from the printer 100A specifying determination results that the printer 100A found using the liquid level sensor described above. Specifically, the acquired status is "normal" when the level ISs is determined to be higher than the empty level EL based on the liquid level sensor, and "low" when the level ISs is determined to be at or below the empty level EL.

The determined status specifies determination results found based on the residual ink percentage IR and reference residual percentage TR in the management process described later. That is, the determined status is "normal" when the residual ink percentage IR is greater than the reference residual percentage TR, and "low" when the residual ink percentage IR is less than or equal to the reference residual percentage TR. When not yet determined, the determined status is not included in the entry EN1.

The replacement count indicates the number of times that the ink cartridge 200A has been replaced in the printer 100A from the beginning of operations in the system 1000 to the present. The supply system indicates one of the single-chamber supply system and double-chamber supply system. Incidentally, the supply system for the printer 100A is the double-chamber supply system.

The residual ink percentage IR is an index value denoting a total residual ink quantity. The total residual ink quantity is the total quantity of a quantity of ink Ik remaining in the ink cartridge 200A and a quantity of ink Ik remaining in the intermediate container 175A. The total residual ink quantity is an example of the claimed "total residual quantity." The quantity of ink Ik remaining in the ink cartridge 200A is an example of the claimed "first residual quantity." The quantity of ink Ik remaining in the intermediate container 175A is an example of the claimed "second residual quantity."

In the present embodiment, the residual ink percentage IR is the ratio of the current total residual ink quantity to the initial ink volume IV of the ink cartridge 200A (in units of % in the present embodiment). Thus, the entire range of possible values for the residual ink percentage IR ranges from 0% to a percentage greater than 100%. The residual ink percentage IR can be called an index value of residual ink quantity. Each time a printing operation is executed on the printer 100A, the printer 100A calculates the residual ink percentage IR using: the consumed quantity of ink Ik calculated on the basis of the print data and the number of printed pages; and the residual ink percentage IR prior to executing the printing operation.

The reference residual percentage TR is used by the management server 300 for determining the determined status described above. The reference residual percentage TR is a threshold value for the residual ink percentage IR described above. When not yet set, the reference residual percentage TR is not included in the entry EN1.

Entries EN2 and EN3 for the printers 100B and 100C, respectively, include information for the same items that are included in the entry EN1 for the printer 100A. However, the printer 100C employs the single-chamber supply system and is not provided with an intermediate container. Thus, the entry EN3 does not include a boundary ink volume BV.

Of the printer information recorded in the management database PD in the present embodiment, the serial number, model name, and IP address for each printer are acquired by the management server 300 when operations of the system 1000 are initiated, for example. In the present embodiment, Simple Network Management Protocol (SNMP) is used for acquiring this information.

Specifically, the management server 300 broadcasts an SNMP request over the local area network NT to search for printers on the local area network NT. The printers 100A, 100B, and 100C issue responses to the SNMP request that include their own IP address. The management server 300 then uses each IP address received in response to the SNMP request to transmit, to each of the printers 100A, 100B, and 100C, an individual SNMP request requesting the transmission of their serial number and model name. Then, the management server 300 receives the serial number and model name for each of the printers 100A, 100B, and 100C in response to these SNMP requests. The management server 300 then records the received serial number, model name, and IP address in the management database PD, thereby registering the printers 100A, 100B, and 100C as printers under management.

Of the printer information recorded in the management database PD, the acquired status, replacement count, ink Ik supply system, initial ink volume IV, boundary ink volume BV, and residual ink percentage IR are acquired from the printers 100A, 100B, and 100C that are under management in the management process described later. The determined status is determined in the management process, and the reference residual percentage TR is set in the reference value setting process (described later in detail).

A-2. Operations of the System 1000

<A-2-1. Management Process>

The management server 300 (the CPU 310) executes the management process for managing printers that are under management. In the present embodiment, the printers under management are the printers 100A, 100B, and 100C. The management server 300 executes this management process periodically, such as at predetermined times with a frequency of one to multiple times per day. The management process is executed for each of the printers 100A, 100B, and 100C that are under management. In the following description, a case where the printer 100A is a target printer for which the management process is executed will be described as an example.

Figure 5:
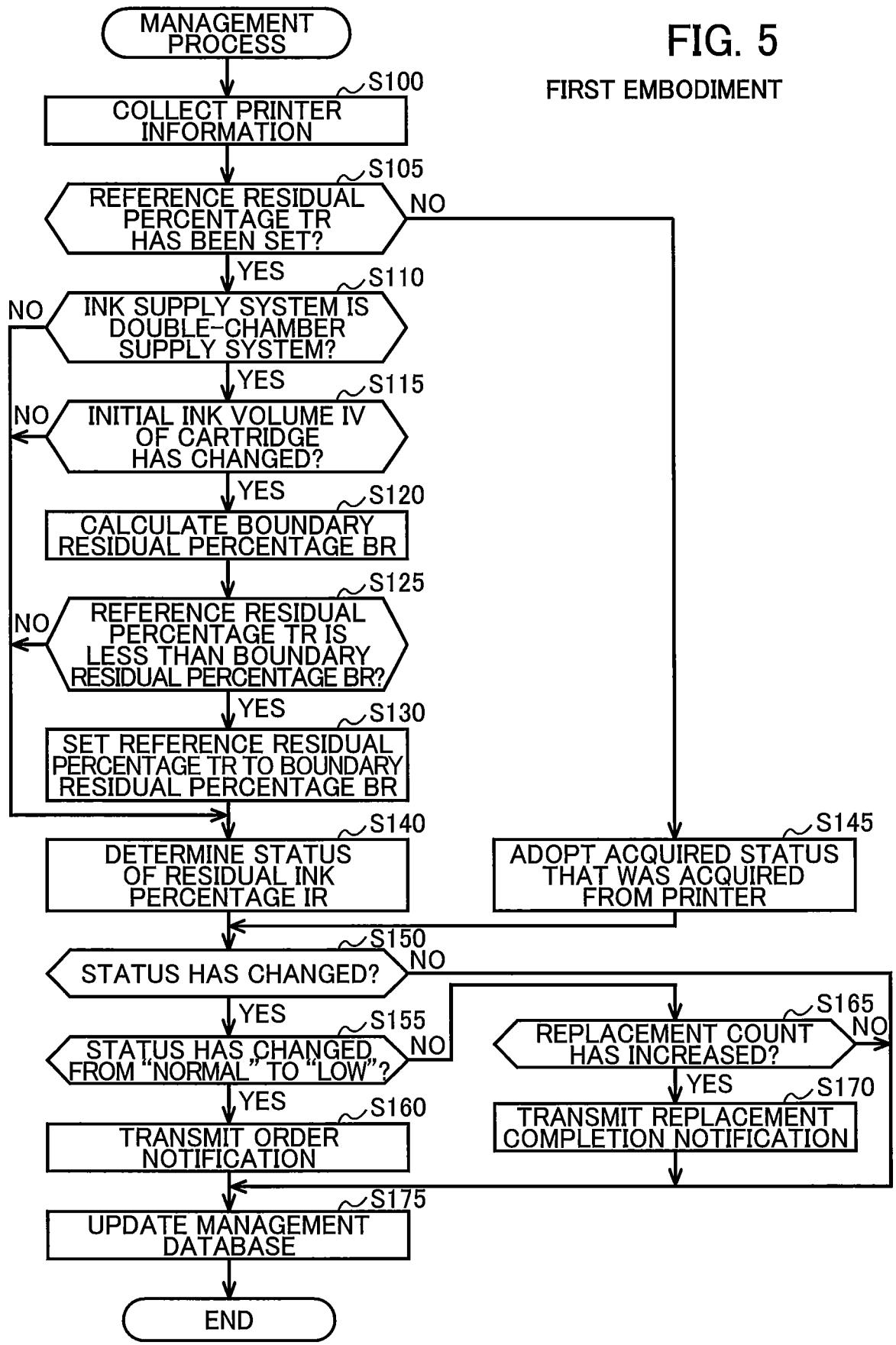
FIG. 5 is a flowchart illustrating steps in the management process performed by the management server 300 according to the first embodiment of the present disclosure.

FIG. 5 is a flowchart illustrating steps in the management process. In S100 of FIG. 5, the management server 300 collects printer information from the printer 100A that is the processing target printer in this example. In the present embodiment, the management server 300 collects printer information using SNMP. Specifically, the management server 300 transmits, to the printer 100A, a SNMP request requesting information items to be collected from the printer information. The management server 300 subsequently receives this printer information from the printer 100A in response to the SNMP request.

The management server 300 records the printer information collected from the printer 100A in the volatile storage device 120. Printer information already recorded in the management database PD is not updated at this time because it will be necessary to reference the previously acquired printer information in a subsequent step. The collected printer information includes the acquired status, replacement count, ink Ik supply system, initial ink volume IV, boundary ink volume BV, and residual ink percentage IR described above.

In S105 the management server 300 determines whether a reference residual percentage TR has been set for the printer 100A. When a reference residual percentage TR has been recorded in the management database PD, the management server 300 determines that a reference residual percentage TR has been set. The management server 300 advances to S110 when a reference residual percentage TR has been set (S105: YES) and advances to S145 when a reference residual percentage TR has not been set (S105: NO).

In S110 the management server 300 determines, on the basis of the ink Ik supply system included in the collected printer information, whether the ink Ik supply system of the processing target printer is the double-chamber supply system. When the ink Ik supply system is the double-chamber supply system (S110: YES), the management server 300 advances to S115. However, if the ink Ik supply system is not the double-chamber supply system, i.e., when the ink Ik supply system is the single-chamber supply system (S110: NO), the management server 300 skips steps S115 through S130 and advances to S140. Since the processing target printer is the printer 100A in this description, in this step the management server 300 determines that the supply system is the double-chamber supply system. When the processing target printer is the printer 100C, the management server 300 will determine that the supply system is not the double-chamber supply system.

In S115 the management server 300 determines whether the initial ink volume IV has changed since the last time the management process was executed. The initial ink volume IV could change because multiple types of ink cartridges 200A having different initial ink volumes IV can be attached to the printer 100A, for example. For example, the initial ink volume IV of an ink cartridge 200A whose main storage chamber 210A has a relatively small capacity differs from the initial ink volume IV of an ink cartridge 200A whose main storage chamber 210A has a relatively large capacity. Consequently, the initial ink volume IV could be different from the last time the management process was executed if the ink cartridge 200A were replaced sometime between the last execution of the management process and the present time.

When the initial ink volume IV specified in the printer information acquired in S100 is different from the initial ink volume IV recorded in the management database PD, the management server 300 determines that the initial ink volume IV has been changed. The management server 300 advances to S120 when the initial ink volume IV has been changed (S115: YES). On the other hand, the management server 300 skips S120 through S130 and advances to S140 when the initial ink volume IV has not changed (S115: NO).

In S120 the management server 300 calculates a boundary index value. The boundary index value is an index value related to the boundary ink volume BV. As indicated in step S220 of the reference value setting process described later with reference to FIG. 7, the management server 300 uses a boundary residual percentage BR as the boundary index value in the first embodiment.

The boundary residual percentage BR is the ratio (in units of % in the present embodiment) of the boundary ink volume BV to the initial ink volume IV (BR=(BV/IV)×100). The boundary residual percentage BR can be thought of as the residual ink percentage IR corresponding to the boundary ink volume BV. That is, the boundary residual percentage BR corresponds to the boundary ink volume BV. For example, if the initial ink volume IV changes from a first value IV1 to a second value IV2 that is smaller than the first value IV1 due to the ink cartridge 200A being replaced, the boundary residual percentage BR will become a larger value than before the replacement of the ink cartridge 200A. The boundary residual percentage BR is an example of the claimed "boundary value."

In S125 the management server 300 determines whether the reference residual percentage TR recorded in the management database PD is less than the boundary residual percentage BR calculated in S120. As will be described later, the reference residual percentage TR is set to a value greater than or equal to the boundary residual percentage BR at the time of setting the reference residual percentage TR. However, if the ink cartridge 200A is replaced, the boundary residual percentage BR could change to a value larger than the value prior to the replacement, causing the already set reference residual percentage TR to become less than the boundary residual percentage BR after the replacement.

When the reference residual percentage TR is less than the boundary residual percentage BR (S120: YES), the management server 300 advances to S130.

In S130 the management server 300 resets the reference residual percentage TR to the boundary residual percentage BR. As will be described later, this step is performed because the reference residual percentage TR is prohibited from being set to a value less than the boundary residual percentage BR in the present embodiment.

On the other hand, when the reference residual percentage TR is greater than or equal to the boundary residual percentage BR (S120: NO), the management server 300 skips S130 and advances to S140.

In S140 the management server 300 determines the status of the residual ink percentage IR by comparing the residual ink percentage IR with the reference residual percentage TR. Specifically, the management server 300 determines that the status of the residual ink percentage IR is "normal" when the residual ink percentage IR is greater than the reference residual percentage TR (IR>TR) and determines that the status is "low" when the residual ink percentage IR is less than or equal to the reference residual percentage TR (IR≤TR).

When the management server 300 determines in S105 that a reference residual percentage TR has not been set (S105: NO), in S145 the management server 300 adopts, as the status of the residual ink percentage IR, the acquired status that is acquired from the printer 100A in S100.

In S150 the management server 300 determines whether the current status of the residual ink percentage IR has changed from the status in the previous management process. When a determined status is recorded in the management database PD, the management server 300 adopts this determined status as the status of the residual ink percentage IR in the previous management process. However, if a determined status is not recorded in the management database PD, the management server 300 adopts, as the status of the residual ink percentage IR in the previous management process, the acquired status recorded in the management database PD.

When the status of the residual ink percentage IR has changed (S150: YES), the management server 300 advances to S155. On the other hand, when the status has not changed (S150: NO), the management server 300 advances to S175.

In S155 the management server 300 determines whether the status of the residual ink percentage IR has changed from "normal" to "low." The management server 300 advances to S160 when the status of the residual ink percentage IR has changed from "normal" to "low" (S155: YES). However, the management server 300 advances to S165 when the status has not changed from "normal" to "low," i.e., when the status has changed from "low" to "normal" (S155: NO).

In S160 the CPU 110 transmits an order notification for an ink cartridge 200A to the vendor server 400. The order notification may be an email addressed to a preregistered email address for the vendor server 400. The order notification includes information indicating that this notification is a notification about an order of an ink cartridge 200A, information identifying the ink cartridge 200A being ordered (the part number, for example), and information identifying the printer 100A (the serial number, for example). The order notification can be considered a notification triggering replenishment of the print executing unit 170A with ink Ik.

When the vendor server 400 receives the order notification, the vendor of the vendor server 400 makes arrangements to ship a new ink cartridge 200A. The new ink cartridge 200A is shipped to a preregistered address for the user of the printers 100A, 100B, and 100C. When the new ink cartridge 200A arrives at this location, the user of the printer 100A replaces the old ink cartridge 200A in the printer 100A with the new ink cartridge 200A.

In S165 the management server 300 determines whether the replacement count for the ink cartridge 200A has increased from the replacement count for the ink cartridge 200A in the previous management process. The management server 300 determines that this replacement count has increased when the replacement count acquired in S100 is greater than the replacement count recorded in the management database PD.

When the replacement count has increased (S165: YES), it is considered that the status of the residual ink percentage IR changed from "low" to "normal" due to the ink cartridge 200A being replaced in the printer 100A. Accordingly, in S170 the management server 300 transmits, to the vendor server 400, a replacement completion notification indicating that replacement of the ink cartridge 200A was completed. As with the order notification, this replacement completion notification is an email addressed to the vendor server 400. The replacement completion notification may include information indicating this notification is a notification notifying that the ink cartridge 200A was replaced, and information identifying the printer 100A, for example. When the vendor server 400 receives this replacement completion notification, the vendor can recognize that the ink cartridge 200A was replaced on the printer 100A.

However, if the replacement count has not increased (S165: NO), then it is considered that the change in the status of the residual ink percentage IR from "low" to "normal" is due to an error in the status of the residual ink percentage IR acquired in the current management process. For example, when the acquired status acquired from the printer 100A is adopted as the status of the residual ink percentage IR (S145), it is possible that an incorrect acquired status was acquired due to a malfunction of the liquid level sensor in the printer 100A. In this case, the management server 300 skips S170 and advances to S175.

In S175 the management server 300 updates the management database PD. Here, printer information collected from the printer 100A and stored in the volatile storage device 120 in S100 is recorded in the entry EN1 associated with the printer 100A in the management database PD. However, when it is determined in S165 that the replacement count has not increased, it is considered that the acquired status is incorrect. Accordingly, the management server 300 updates the printer information, excluding the acquired status (i.e., the acquired status is not updated). Further, when the management server 300 determines the status of the residual ink percentage IR in S140, in S175 the management server 300 records this status determined in S140 in the management database PD as the determined status.

In the management process described above, if a reference residual percentage TR has been set for the processing target printer, the condition for transmitting an order notification is that the state of the residual ink percentage IR has changed from a state of being greater than the reference residual percentage TR (i.e., a state in which the status is determined to be "normal") to a state of being less than or equal to the reference residual percentage TR (i.e., a state in which the status is determined to be "low").

Further, the condition for transmitting an order notification can be considered a condition for determining that replenishment of ink Ik is necessary. Accordingly, the condition for transmitting an order notification will be called a "replenishment condition." When a reference residual percentage TR has not been set for the processing target printer, the replenishment condition is that the acquired status determined on the basis of the liquid level sensor in the processing target printer changes from "normal" to "low".

<A-2-3. Printer Information Display Process>

Separate from the management process described above, the management server 300 executes a printer information display process to display a management list ML on the display unit 340 when a request to display the list is acquired from the user via the user interface 350. The user of the management server 300 is the administrator of the system 1000, for example. The administrator of the system 1000 may be a user of the printers 100A, 100B, and 100C or may be someone other than a user of the printers 100A, 100B, and 100C, such as the vendor of the printers 100A, 100B, and 100C.

FIG. 6 illustrates an example of the management list ML. The management list ML is generated on the basis of the management database PD and is a list of printer information for the printers 100A, 100B, and 100C under management.

In this example, the management list ML includes three lines L1, L2, and L3 corresponding, respectively, to the three printers 100A, 100B, and 100C under management. The lines L1, L2, and L3 include some of the printer information included in the corresponding entries EN1, EN2, and EN3 in the management database PD. Displaying the management list ML allows the user to easily confirm printer information for the printers 100A, 100B, and 100C under management.

The user manipulates a cursor CS to select one of the lines L1, L2, and L3 corresponding to the desired target printer and performs a prescribed operation on the line (a right mouse click, for example) to display a sub-window SW on the display unit 340. In the example of FIG. 6, line L3 corresponding to the printer 100C has been selected. The sub-window SW displays a list of processes that can be performed. Possible processes in the example of FIG. 6 include a deleting process to delete the printer information, an updating process to update the printer information, and a reference value setting process.

When the user operates the cursor CS to select the reference value setting process in the sub-window SW and performs a prescribed operation on the selected process (a left mouse click, for example), the management server 300 acquires a request to initiate the reference value setting process for the target printer. In this way, the user can select one of the printers 100A, 100B, and 100C as the target printer for the reference value setting process. The start request is an example of the claimed "request to output the screen data."

<A-2-4. Reference Value Setting Process>

Figure 7:
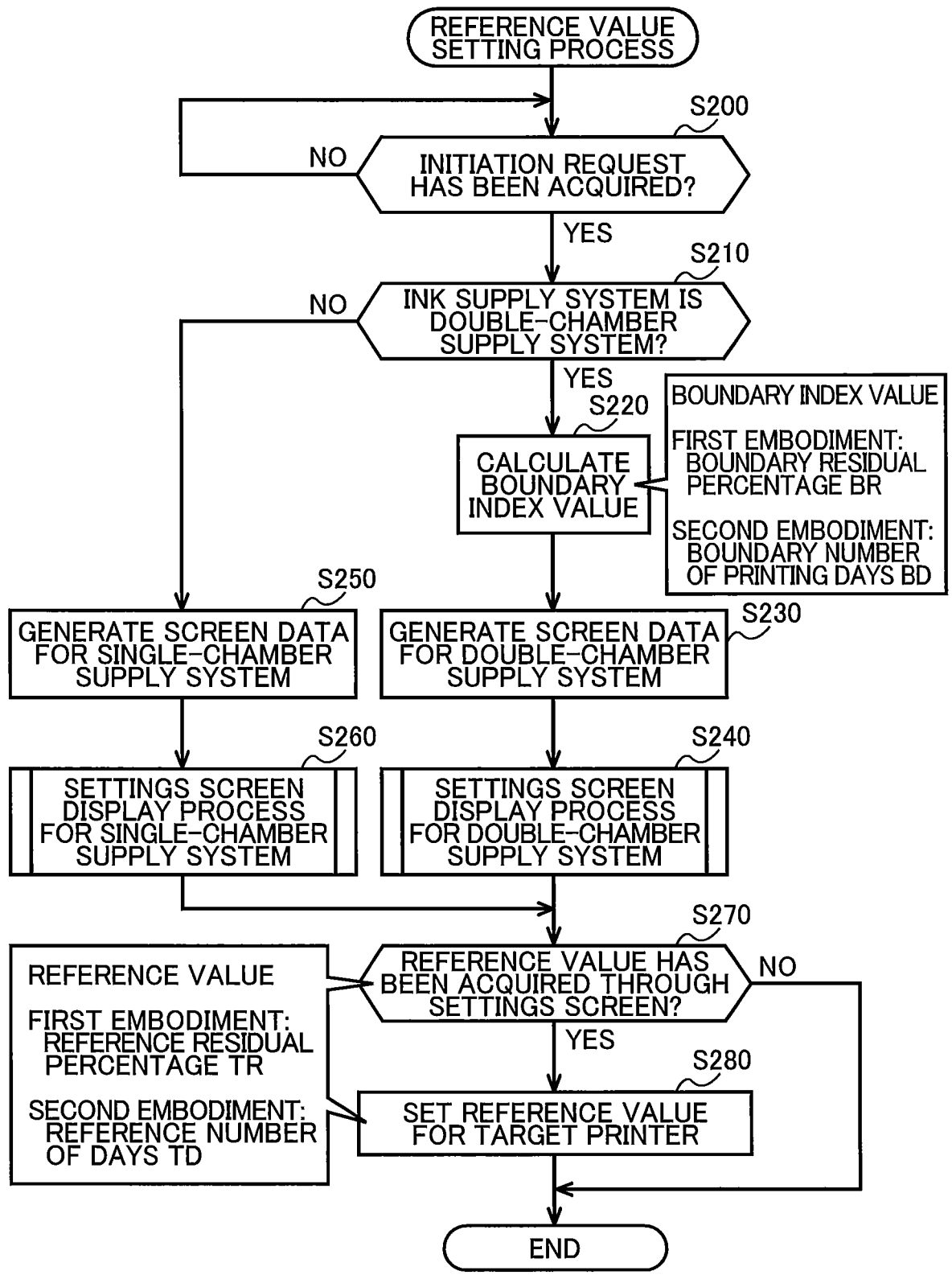
FIG. 7 is a flowchart illustrating steps in a reference value setting process performed by the management server 300 according to the first embodiment of the present disclosure.

FIG. 7 is a flowchart illustrating steps in the reference value setting process. The reference value setting process is a process for setting a reference value used in the management process described above for the target printer. In the first embodiment, the reference value is the reference residual percentage TR.

In S200 the management server 300 (the CPU 310) determines whether the request described above to initiate the reference value setting process has been acquired. If the start request has been acquired (S200: YES), the management server 300 advances to S210. However, while a start request has not been acquired (S200: NO), the management server 300 waits until a start request is acquired.

In S210, on the basis of information included in the already acquired printer information specifying the supply system for the ink Ik, the management server 300 determines whether the ink Ik supply system for the target printer is the double-chamber supply system. The management server 300 advances to S220 when the supply system is the double-chamber supply system (S210: YES). On the other hand, the management server 300 advances to S250 when the supply system is not the double-chamber supply system (S210: NO).

In S220 the management server 300 calculates the boundary index value. In the first embodiment, the boundary index value is the boundary residual percentage BR. The boundary residual percentage BR is calculated on the basis of the initial ink volume IV and boundary ink volume BV recorded in the management database PD for the target printer.

As described above, the boundary residual percentage BR is the ratio of the boundary ink volume BV to the initial ink volume IV. In the example of FIG. 4, the initial ink volume IV for the printer 100A is 1000, and the boundary ink volume BV is 200. Accordingly, the boundary residual percentage BR is 20%. As described above, various types of ink cartridges 200A having different initial ink volumes IV can be attached to the printer 100A. If the ink cartridge 200A attached to the printer 100A has an initial ink volume IV of 2000, the boundary residual percentage BR is 10%.

In S230 the management server 300 generates screen data for the double-chamber supply system. In S240 the management server 300 executes a settings screen display process for the double-chamber supply system using the screen data generated in S230. In the settings screen display process, the management server 300 displays a settings screen Wa on the display unit 340 and acquires a user-designated reference residual percentage TR (i.e., a user-desired reference residual percentage TR) via the settings screen Wa.

Figure 8:
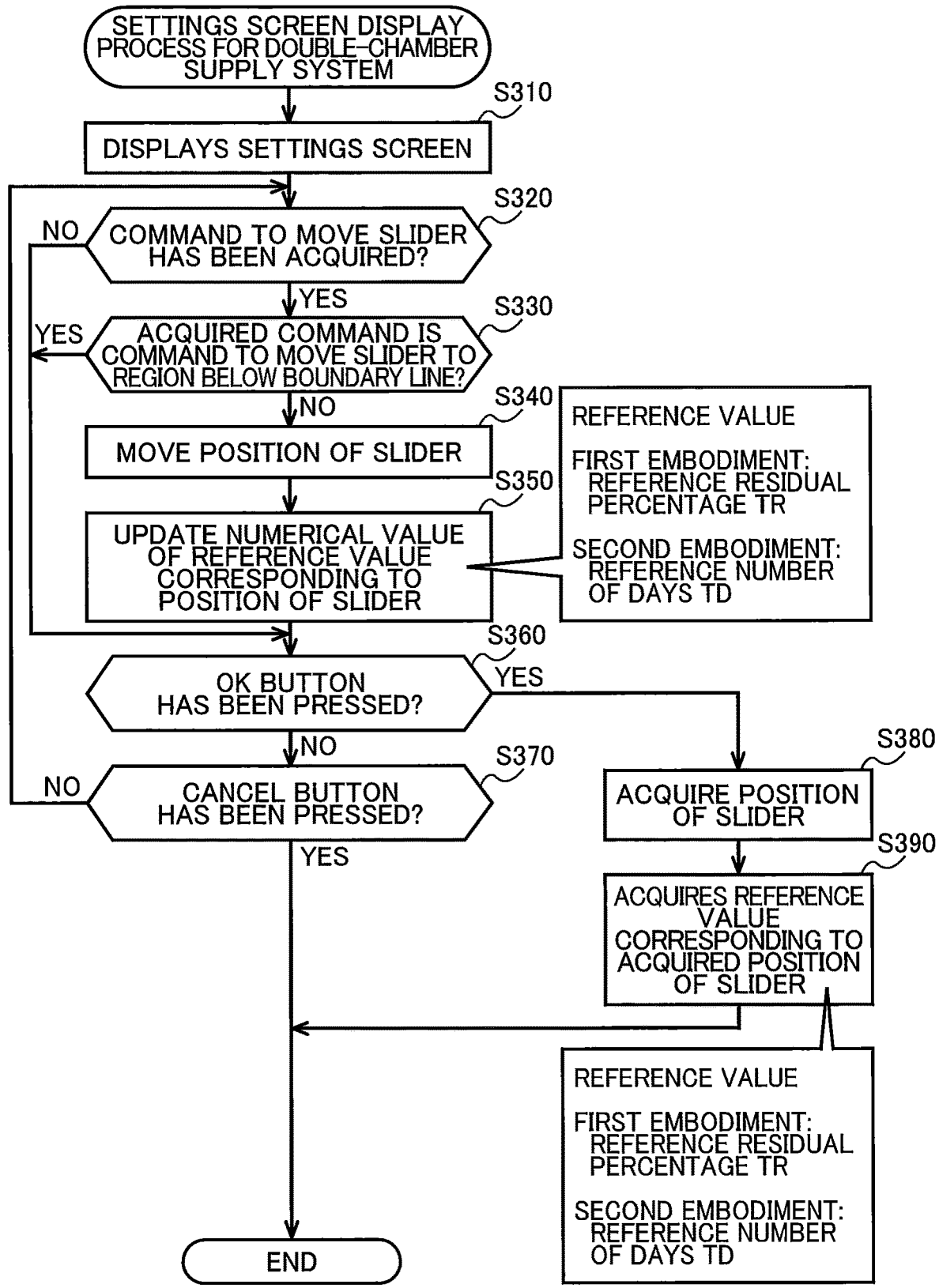
FIG. 8 is a flowchart illustrating steps in a settings screen display process for a double-chamber supply system performed by the management server 300 according to the first embodiment of the present disclosure.

FIG. 8 is a flowchart illustrating steps in the settings screen display process for a double-chamber supply system. In S310 the management server 300 displays, on the display unit 340, the settings screen Wa using the screen data for a double-chamber supply system.

Figure 9A:
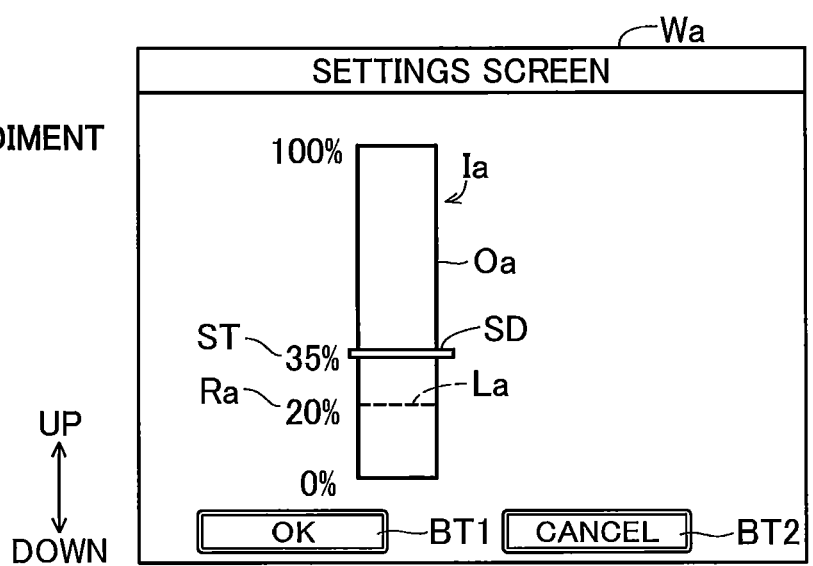
FIG. 9A illustrates a setting screen Wa displayed by the management server 300 according to the first embodiment of the present disclosure.
Figure 9B:
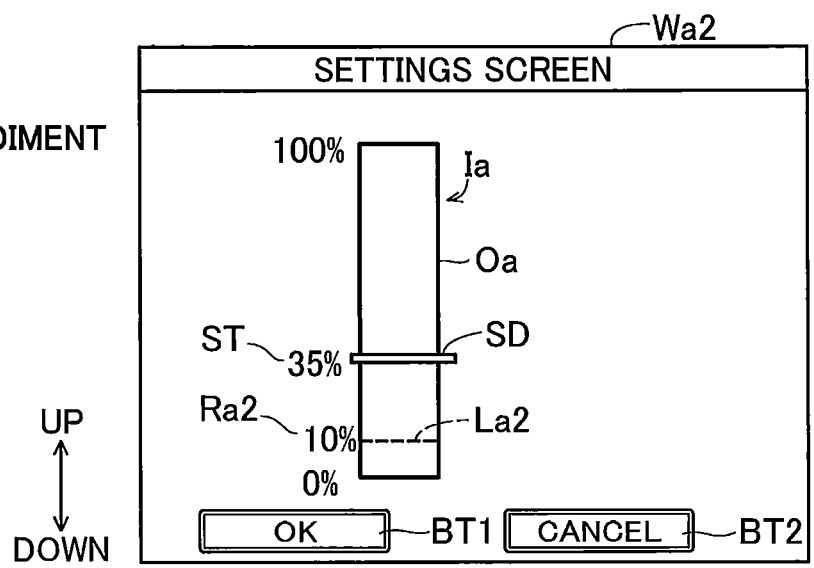
FIG. 9B illustrates a setting screen Wa2 displayed by the management server 300 according to the first embodiment of the present disclosure.
Figure 9C:
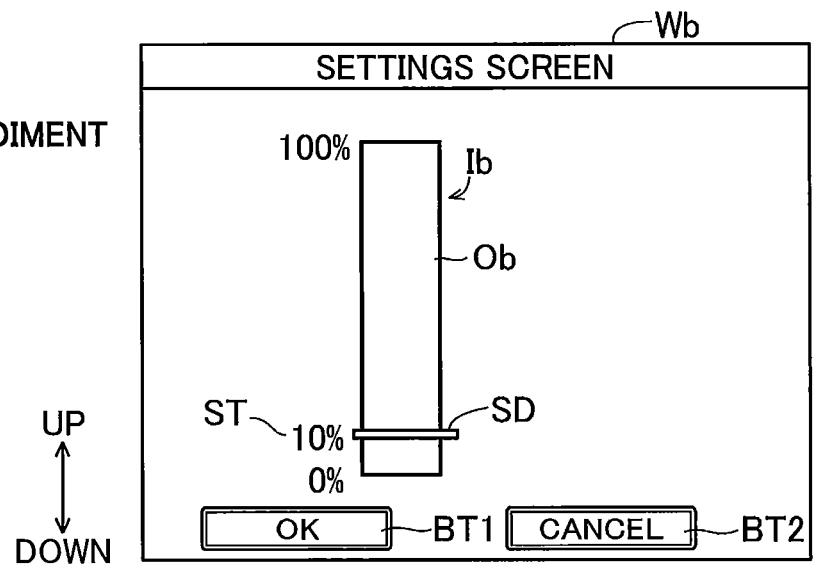
FIG. 9C illustrates a settings screen Wb displayed by the management server 300 according to the first embodiment of the present disclosure.

FIGS. 9A to 9C illustrate examples of settings screens according to the first embodiment. The settings screen Wa in FIG. 9A is a screen for acquiring user instructions specifying a desired reference residual percentage TR. In other words, the settings screen Wa is a screen for setting a reference residual percentage TR on the basis of a user instruction. The settings screen Wa includes: a user interface image Ia (hereinafter, referred to as "UI image Ia") enabling the user to input a desired reference residual percentage TR; an OK button BT1; and a Cancel button BT2.

The UI image Ia includes a bar-shaped object Oa, a slider SD arranged on the object Oa, and a boundary line La arranged on the object Oa.

The object Oa represents a specific range of possible residual ink percentages IR. The specific range of possible residual ink percentages IR represented by the object Oa includes the boundary residual percentage BR. Longitudinal (vertical in FIG. 9A) positions along the object Oa correspond to possible values of the residual ink percentage IR. The upper end of the object Oa corresponds to 100%, while the bottom end of the object Oa corresponds to 0% (i.e., the minimum value for the residual ink percentage IR). The object Oa is an example of the claimed "indication of a specific range of possible values for the index value."

Note that, since the entire range of possible residual ink percentages IR ranges from 0% to a percentage greater than 100% as described above, the specific range represented by the object Oa is a part of the entire range. That is, in the present embodiment, the object Oa represents a part of the entire range of possible residual ink percentages IR. Alternatively, the object Oa may represent the entire range of possible residual ink percentages IR. In this case, the upper end of the object Oa corresponds to the maximum value (more than 100%) for the residual ink percentage IR, while the bottom end of the object Oa corresponds to the minimum value (0%).

The slider SD indicates the user-designated reference residual percentage TR within the specific range of values represented by the object Oa. The slider SD is moved over the object Oa in the longitudinal direction (vertical direction in FIG. 9A) thereof in response to move commands inputted by the user. As will be described later, move commands may be implemented through mouse input, for example. By moving the slider SD, the user can adjust (change) the reference residual percentage TR. A numerical value ST ("35%" in the example of FIG. 9A) displayed near the slider SD in the settings screen Wa specifies the reference residual percentage TR corresponding to the position of the slider SD. Each of the slider SD and the numerical value ST is an example of the claimed "indication of a value designated from the specific range as the reference value by the user instruction."

The boundary line La denotes the boundary residual percentage BR calculated in S220 of FIG. 7. The boundary line La is arranged at a longitudinal position on the object Oa corresponding to the boundary residual percentage BR. A numerical value Ra ("20%" in the example of FIG. 9A) displayed near the boundary line La specifies the boundary residual percentage BR. Each of the boundary line La and the numerical value Ra is an example of the claimed "indication of a boundary value."

Here, the position of the boundary line La and the value of the numerical value Ra vary depending on the initial ink volume IV of the ink cartridge 200A. The settings screen Wa in FIG. 9A depicts an example in which the initial ink volume IV is 1000. A settings screen Wa2 shows an example in which the initial ink volume IV is 2000.

The boundary residual percentage BR specified by the position of a boundary line La2 and a numerical value Ra2 (10%) in the settings screen Wa2 is smaller than the boundary residual percentage BR specified by the position of the boundary line La and the numerical value Ra (20%) in the settings screen Wa. Each of the boundary line La2 and the numerical value Ra2 is an example of the claimed "indication of a boundary value."

Thus, when the initial ink volume IV is a first quantity (1000, for example), the management server 300 generates screen data representing the settings screen Wa (FIG. 9A) including a boundary residual percentage BR that is the ratio of the boundary ink volume BV to the first quantity (20%, for example). When the initial ink volume IV is a second quantity larger than the first quantity (2000, for example), the management server 300 generates screen data representing the settings screen Wa2 (FIG. 9B) including a boundary residual percentage BR that is the ratio of the boundary ink volume BV to the second quantity (10%, for example). In this way, the management server 300 generates screen data representing an appropriate settings screen according to the initial ink volume IV of the ink cartridge 200A. The ratio of the boundary ink volume BV to the first quantity (20%, for example) displayed in the settings screen Wa is an example of the claimed "first ratio." The ratio of the boundary ink volume BV to the second quantity (10%, for example) displayed in the settings screen Wa2 is an example of the claimed "second ratio."

In S320 the management server 300 determines whether a move command for the slider SD has been acquired. When a move command for the slider SD has not been acquired (S320: NO), the management server 300 skips steps S330-S350 and advances to S360. However, if a move command for the slider SD has been acquired (S320: YES), in S330 the management server 300 determines whether the acquired move command is a command to move the slider SD to the region of the object Oa below the boundary line La. In other words, the management server 300 determines whether the acquired move command is a command for moving the slider SD such that the reference residual percentage TR indicated by the position of the slider SD is a value less than the boundary residual percentage BR. The user command to move the slider SD to the region of the object Oa below the boundary line La is an example of the claimed "inappropriate operation." In the specific range of possible values for the residual ink percentage IR, the range corresponding to the region of the object Oa below the boundary line La is an example of the claimed "prohibited range."

When the acquired move command is not a command to move the slider SD to the region of the object Oa below the boundary line La (S330: NO), in S340 the management server 300 moves the display position of the slider SD according to the move command. In S350 the management server 300 updates the numerical value ST of the reference value corresponding to the position of the slider SD. Specifically, in the first embodiment, in S350 the management server 300 updates the numerical value ST of the reference residual percentage TR corresponding to the position of the slider SD. Subsequently, the management server 300 advances to S360.

On the other hand, if the acquired move command is a command to move the slider SD to the region of the object Oa below the boundary line La (S330: YES), the management server 300 skips steps S340 and S350 and advances to S360. Hence, the management server 300 does not move the slider SD in this case, regardless of the move command that was acquired. In this way, movement of the slider SD is allowed in the region of the object Oa at or above the boundary line La, but is prohibited in the region below the boundary line La.

In S360 the management server 300 determines whether the OK button BT1 in the settings screen Wa has been pressed. If the OK button BT1 has been pressed (S360: YES), in S380 the management server 300 acquires the current position of the slider SD as the user-designated reference residual percentage TR.

In S390 the management server 300 acquires the reference value corresponding to the acquired position of the slider SD. Specifically, in the first embodiment, the management server 300 acquires the reference residual percentage TR corresponding to the acquired position of the slider SD. Subsequently, the management server 300 ends the settings screen display process.

On the other hand, if the OK button BT1 has not been pressed (S360: NO), in S370 the management server 300 determines whether the Cancel button BT2 in the settings screen Wa has been pressed. If the Cancel button BT2 has been pressed (S370: YES), the management server 300 determines that a user-designated reference residual percentage TR has not been inputted. In this case, the management server 300 ends the settings screen display process without acquiring a reference residual percentage TR. However, if the Cancel button BT2 was not pressed (S370: NO), the management server 300 returns to S320 and repeats the process described above.

Returning to the reference value setting process of FIG. 7, if the management server 300 determines in S210 that the supply system is not the double-chamber supply system (S210: NO), in S250 the management server 300 generates screen data for the single-chamber supply system. In S260 the management server 300 executes a settings screen display process for the single-chamber supply system using the screen data generated in S250. In this settings screen display process, the management server 300 displays a settings screen Wb on the display unit 340 and acquires a newly designated reference residual percentage TR from the user through the settings screen Wb.

FIG. 9C shows an example of the settings screen Wb. The settings screen Wb includes a UI image Ib through which the user inputs a desired reference residual percentage TR, an OK button BT1, and a Cancel button BT2. The UI image Ib includes a bar-shaped object Ob, and a slider SD arranged on the object Ob.

As with the object Oa described above, the object Ob specifies a specific range of possible values for the residual ink percentage IR (the range from 0 to 100%, for example). Longitudinal positions along the object Ob correspond to possible values for the residual ink percentage IR.

The slider SD in the settings screen Wb indicates the user-designated reference residual percentage TR within the specific range represented by the object Ob. By moving the slider SD, the user can adjust (change) the reference residual percentage TR. A numerical value ST ("20%" in the example of FIG. 9C) displayed in the vicinity of the slider SD indicates the reference residual percentage TR corresponding to the position of the slider SD.

Since an intermediate container is not present in the single-chamber supply system, the concept of a boundary residual percentage BR does not exist. Therefore, the settings screen Wb does not include a boundary line La corresponding to the boundary residual percentage BR.

A flowchart illustrating steps in the settings screen display process for the single-chamber supply system has been omitted, but the process differs from the settings screen display process for the double-chamber supply system shown in FIG. 8 only in that the determination in S330 is not executed since a boundary line La does not exist in the settings screen Wb. All other steps in the settings screen display process for the single-chamber supply system are identical to those in the settings screen display process for the double-chamber supply system of FIG. 8.

In S270 of FIG. 7, the management server 300 determines whether a user-desired reference value (i.e., a user-designated reference value) was acquired through the settings screen (the settings screen Wa, Wa2, or Wb) in S240 or S260. The reference value in the first embodiment is the reference residual percentage TR.

If a user-designated reference residual percentage TR was acquired (S270: YES), in S280 the management server 300 sets the reference residual percentage TR acquired in S240 or S260 as the reference value for the target printer. Specifically, the management server 300 records the reference residual percentage TR acquired in S240 or S260 in one of the entries EN1 to EN3 in the management database PD corresponding to the processing target printer. Subsequently the management server 300 ends the reference value setting process. Note that, if a reference residual percentage TR is currently recorded at this time, the already recorded reference residual percentage TR is deleted, that is, the already recorded reference residual percentage TR is overwritten by the reference residual percentage TR acquired in S240 or S260. On the other hand, if a user-designated reference residual percentage TR was not acquired (S270: NO), the management server 300 ends the reference value setting process without executing step S280.

According to the first embodiment described above, the management server 300 uses the residual ink percentage IR acquired from the print executing unit 170A (the printer 100A) to determine whether the replenishment condition has been met. In other words, the management server 300 compares the residual ink percentage IR acquired from the print executing unit 170A (the printer 100A) with the reference residual percentage TR set through the settings screen Wa to determine whether the replenishment condition has been met. The management server 300 transmits an order notification (S160 of FIG. 5) when the replenishment condition has been met (S140, S150: YES, and S155: Yes in FIG. 5). The management server 300 generates screen data (S230 of FIG. 7) representing the settings screen Wa for setting the reference residual percentage TR on the basis of user instructions in order to determine whether the replenishment condition has been met, and displays the settings screen Wa (S240 of FIG. 7) based on this screen data. The settings screen Wa includes not only the object Oa and slider SD but also the boundary line La specifying the boundary residual percentage BR. Thus, the user can set a reference residual percentage TR while observing the settings screen Wa that includes the object Oa indicating the specific range of possible residual ink percentages IR, and the boundary line La specifying the boundary residual percentage BR. Accordingly, the user can set a suitable reference residual percentage TR for determining whether the replenishment condition has been met. For example, when the print executing unit utilizes a double-chamber supply system, i.e., when the print executing unit is configured with a container disposed along the ink path leading from the cartridge to the printing mechanism, as are the print executing units 170A and 170B, a suitable reference residual percentage TR can be set because a boundary residual percentage BR can be appropriately displayed on the settings screen.

As a more specific example, in the printer 100A having a double-chamber supply system (the print executing unit 170A shown in FIG. 2), after the storage condition of the ink Ik reaches the second storage state S2, the ink cartridge 200A can be replaced at any time without wasting ink Ik since ink Ik no longer remains in the ink cartridge 200A. Thus, there is no reason for setting the reference residual percentage TR to a value less than the boundary residual percentage BR corresponding to the boundary between the first storage state S1 and second storage state S2 from the perspective of wasting ink. Setting the reference residual percentage TR to a value less than the boundary residual percentage BR delays the timing at which an order notification is transmitted, which increases the possibility that the print executing unit 170A will run out of ink Ik and the printer 100A will become unable to print before the new ink cartridge 200A arrives. For this reason, it is preferable that the reference residual percentage TR be set to a value greater than or equal to the boundary residual percentage BR. In the example of the present embodiment, the user can set the reference residual percentage TR to a suitable value greater than or equal to the boundary residual percentage BR while observing the settings screen Wa that includes the boundary line La specifying the boundary residual percentage BR.

In the present embodiment, the management server 300 also acquires a user command (a user operation) specifying a desired reference residual percentage TR (and specifically the position of the slider SD when the OK button BT1 has been pressed) through the settings screen Wa (S380 of FIG. 8). In other words, the management server 300 acquires a user operation to designate a value as the reference residual percentage TR. This user operation is an example of the claimed "user designation operation."

Further, the management server 300 allows the slider SD to be moved over the object Oa within the region directly at or above the boundary line La, but prohibits the slider SD from being moved into the region lower than the boundary line La (S330 and S340 of FIG. 8). Accordingly, the management server 300 accepts input of user instructions specifying a reference residual percentage TR greater than or equal to the boundary residual percentage BR, but prevents (or refuses) input of user instructions specifying a reference residual percentage TR less than the boundary residual percentage BR. In other words, the management server 300 allows the user to input a command specifying a reference residual percentage TR that corresponds to the residual ink percentage IR for a total residual ink quantity greater than or equal to the boundary ink volume BV, but prevents the user from inputting a reference residual percentage TR corresponding to the residual ink percentage IR for a total residual ink quantity less than the boundary ink volume BV. As a result, a suitable reference residual percentage TR corresponding to the residual ink percentage IR for a total residual ink quantity greater than or equal to the boundary ink volume BV can be set. Since ink Ik no longer remains in the ink cartridge 200A when the total residual ink quantity reaches a condition lower than the boundary ink volume BV, there is no need to wait any longer to replace the ink cartridge 200A, as described above. Therefore, it is preferable that the reference residual percentage TR corresponding to a total residual ink quantity greater than or equal to the boundary ink volume BV is set. In the present embodiment, since the reference residual percentage TR corresponding to a total residual ink quantity greater than or equal to the boundary ink volume BV is set, the reference residual percentage TR is set appropriately.

Further, the replenishment condition in the present embodiment is determined to be met when the status of the residual ink percentage IR is "low" (S155: YES in FIG. 5), i.e., when the residual ink percentage IR is less than or equal to the reference residual percentage TR. Accordingly, an order notification can be sent at a suitable timing. Here, the event in which the residual ink percentage IR is less than or equal to the reference residual percentage TR can be considered the same as when the total residual ink quantity corresponding to the residual ink percentage IR is less than or equal to the total residual ink quantity corresponding to the reference residual percentage TR.

In the present embodiment, the residual ink percentage IR, and specifically the ratio of the total residual ink quantity to the initial ink volume IV, is used as an index value for the total residual ink quantity. Further, the boundary residual percentage BR, and specifically the ratio of the boundary ink volume BV to the initial ink volume IV, is used as an index value for the boundary between the first storage state S1 and second storage state S2. Thus, since the residual ink percentage IR is a reference value for the residual ink percentage IR that is an index value that the user can more easily comprehend, the user can set a suitable reference residual percentage TR for the residual ink percentage IR.

In the present embodiment, if the reference residual percentage TR already set by the user becomes less than the boundary residual percentage BR (S125: YES in FIG. 5) owing to the ink cartridge 200A attached to the attachment portion 172A changing from a first cartridge having an initial ink volume IV of a third volume to a second cartridge having an initial ink volume IV of a fourth volume smaller than the third volume, the management server 300 sets the reference residual percentage TR to the boundary residual percentage BR (S130 of FIG. 5). Hence, the reference residual percentage TR can be modified to a suitable value, even when the reference residual percentage TR switches to an unsuitable value less than the boundary residual percentage BR owing to the ink cartridge 200A being replaced.

In the present embodiment, in response to acquiring a start request from the user (FIG. 6; S200 in FIG. 7), the management server 300 initiates the reference value setting process for the target printer and generates screen data representing the settings screen Wa (S230 in FIG. 7). Thus, the management server 300 can generate screen data at a suitable timing for the user in response to a user request. In other words, a start request received from the user can be considered a request to display the settings screen Wa. Further, since the ink cartridge 200A can be replaced at any time, in some cases the settings screen Wa to be displayed must be altered if the ink cartridge 200A has been replaced. Therefore, it is preferable to generate screen data each time a request is received from the user.

As described above in the embodiment, the management server 300 executes the management process shown in FIG. 5 with one of the printers 100A, 100B, and 100C as the target printer and repeats the management process until all of the printers 100A, 100B, and 100C have been selected as the target printer. That is, the management server 300 executes the management process shown in FIG. 5 for each of the printers 100A, 100B, and 100C. Accordingly, the management server 300 acquires printer information (S100 of FIG. 5) that includes the initial ink volume IV and the boundary ink volume BV from each of the printers 100A and 100B via the communication interface 380. As shown in FIG. 6, the management server 300 can execute the reference value setting process for each of the printers 100A and 100B. In other words, the management server 300 generates screen data for the printer 100A using the initial ink volume IV and boundary ink volume BV acquired from the printer 100A, and generates screen data for the printer 100B using the initial ink volume IV and boundary ink volume BV acquired from the printer 100B. As a result, a suitable reference residual percentage TR can be set for each printer under management. The initial ink volume IV acquired from the printer 100A is an example of the claimed "first printing agent information." The initial ink volume IV acquired from the printer 100B is an example of the claimed "second printing agent information."

As described above, the residual ink percentage IR in the present embodiment is printer information related to the residual quantity of printing agent and an example of the index value; the boundary residual percentage BR is an example of the boundary index value; the reference residual percentage TR is an example of the reference value; and the boundary ink volume BV is an example of the boundary quantity.

B. Second Embodiment

In the second embodiment, the management server 300 uses a number of remaining printing days RD in place of the residual ink percentage IR as the index value for the total residual ink quantity that is used for determining whether the replenishment condition has been met. The remaining printing days RD is a number of days specifying a period of time that corresponds to the total residual ink quantity (or the residual ink percentage IR). Specifically, the remaining printing days RD for the printer 100A indicates the period of time in which printing will be possible without replacing the ink cartridge 200A. For example, a remaining printing days RD of ten days signifies that the printer 100A can continue printing for ten days from the current date without having the ink cartridge 200A replaced. The same is true with respect to the remaining printing days RD for the printer 100B and the remaining printing days RD for the printer 100C. However, in the second embodiment, the index value for the total residual ink quantity that the management server 300 acquires from the printers 100A, 100B, and 100C is the residual ink percentage IR, as in the first embodiment. The remaining printing days RD is an example of the claimed "remaining printing period of time."

Figure 10:
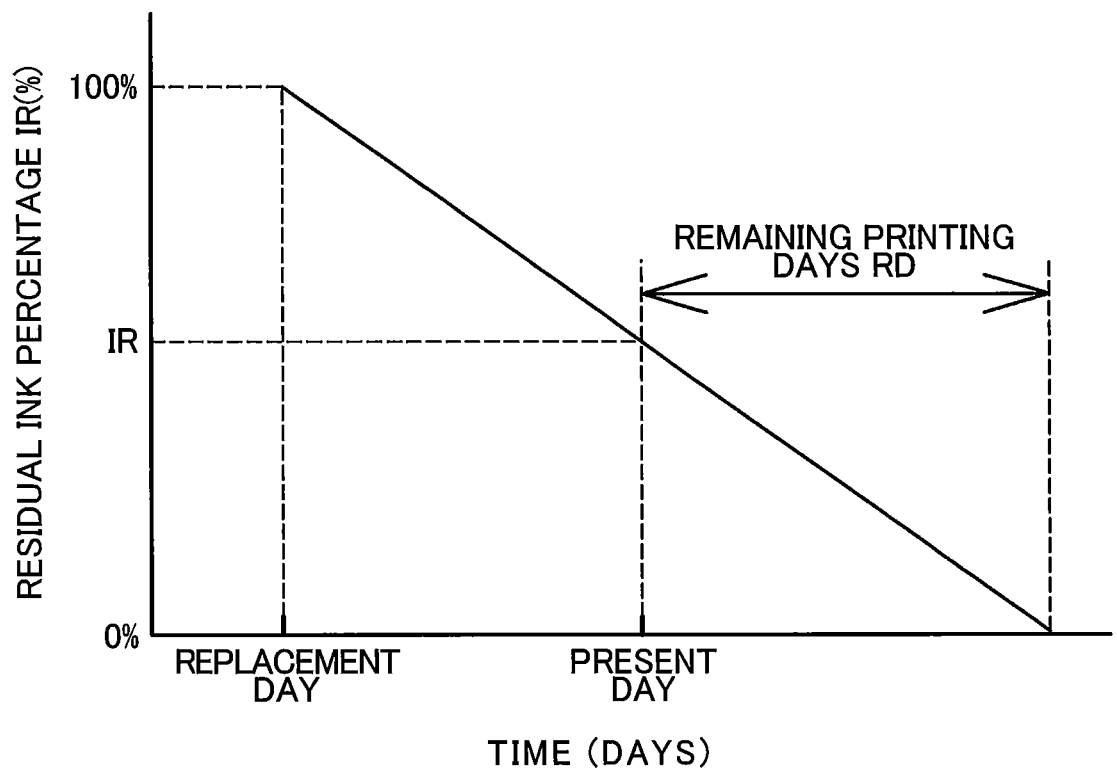
FIG. 10 is a graph for explaining how remaining printing days RD is calculated by a management server according to a second embodiment.

FIG. 10 is a graph illustrating how the remaining printing days RD is calculated. Hereinafter, the method of calculating the remaining printing days RD for the printer 100A under management will be described as an example. Note that since the same method of calculating the remaining printing days RD is used for all of the printers (the printers 100A, 100B, and 100C) under management, detailed descriptions of calculations of the remaining printing days RD for the printer 100B and 100C will be omitted.

The day on which the ink cartridge 200A was replaced with a new ink cartridge 200A will be called the "replacement day." In other words, the replacement day denotes the day on which the ink cartridge 200A currently attached to the attachment portion 172A was initially attached to the same.

In the calculation of the remaining printing days RD for the printer 100A, although the residual ink percentage in the printer 100A on the replacement day is actually greater than or equal to 100%, the actual residual ink percentage on the replacement day is rounded to exactly 100% and the rounded percentage (i.e., 100%) is used as the residual ink percentage on the replacement day. The same is true with respect to the calculation of the remaining printing days RD for the printer 100B. Note that, the actual residual ink percentage in the printer 100C on the replacement day is 100% because the printer 100C is not provided with an intermediate container.

As described above, in the calculations of the remaining printing days RD for the printers 100A and 100B in the second embodiment, the rounded residual ink percentage (i.e., 100%) is used as the residual ink percentage on the replacement day; however, the actual residual ink percentage on the replacement day may be used, in place of the rounded percentage (i.e., 100%), as the residual ink percentage on the replacement day.

Further, the current residual ink percentage is the residual ink percentage IR recorded in a management database PD2 described later (the residual ink percentage IR acquired from the printer 100A). Assuming that the consumption of ink Ik from the replacement day to the present day were to continue at the same rate, the remaining printing days RD can be calculated according to equation (1) below using the replacement day and the residual ink percentage IR.

$$RD=(UD \times IR)/(100-IR) \qquad (1)$$

Here, "UD" denotes the period of time (number of days) from the replacement day to the present day, and "100" denotes the residual ink percentage on the replacement day.

<B-1. Management Database PD2>

In the second embodiment, in order to determine whether the replenishment condition has been met on the basis of the remaining printing days RD, some of the information managed in the management database PD2 differs from information managed in the management database PD of the first embodiment.

FIG. 11 shows an example of the management database PD2 according to the second embodiment. As with the management database PD shown in FIG. 4, the management database PD2 includes entries EN1$b$, EN2$b$, and EN3$b$ corresponding to the target printers 100A, 100B, and 100C, respectively.

As with the entry EN1 in FIG. 4, the entry EN1$b$ corresponding to the printer 100A includes a plurality of items of printer information for the printer 100A, and specifically a serial number, model name, IP address, acquired status, determined status, replacement count, ink Ik supply system, initial ink volume IV, boundary ink volume BV, and residual ink percentage IR. Note that the model name and IP address are not shown in the table of FIG. 11.

Further, the entry EN1$b$ corresponding to the printer 100A includes information specifying a reference number of days TD in place of the reference residual percentage TR included in the entry EN1 of FIG. 4. The reference number of days TD is used on the management server 300 for determining the status of the remaining printing days RD. The reference number of days TD is a threshold value for the remaining printing days RD and is set through a settings screen WaB described later. The entry EN1$b$ does not include the reference number of days TD when the reference number of days TD has not yet been set.

The entry EN1$b$ corresponding to the printer 100A also includes the replacement day described above, and a boundary number of printing days BD.

The boundary number of printing days BD is equivalent to the remaining printing days RD when ink Ik of the boundary ink volume BV remains in a printer employing a double-chamber supply system (the printers 100A and 100B, for example). In other words, the boundary number of printing days BD is the remaining printing days RD at the boundary between the first storage state S1 and second storage state S2. Assuming that ink consumed from the replacement day to the current day continues at the same rate, the boundary number of printing days BD is calculated according to equation (2) below using the replacement day, boundary ink volume BV, and residual ink percentage IR described above. Note that, also in the calculation of the boundary number of printing days BD, the actual residual ink percentage on the replacement day is rounded to exactly 100% and the rounded percentage (i.e., 100%) is used as the residual ink percentage on the replacement day, as with the calculation of the remaining printing days RD. Alternatively, also in the calculation of the boundary number of printing days BD, the actual residual ink percentage on the replacement day may be used, in place of the rounded residual ink percentage, as the residual ink percentage on the replacement day.

$$BD=(UD \times BV)/(100-IR) \qquad (2)$$

Here, "UD" denotes the period of time (number of days) from the replacement day to the present day, and "100" denotes the residual ink percentage on the replacement day.

The entries EN2$b$ and EN3$b$ respectively corresponding to the printers 100B and 100C include information specifying the same items included in the entry EN1$b$ corresponding to the printer 100A. However, the printer 100C utilizes a single-chamber supply system and is not provided with an intermediate container. Therefore, the entry EN3$b$ include neither the boundary ink volume BV nor boundary number of printing days BD.

Of the printer information recorded in the management database PD2, the acquired status, replacement count, replacement day, ink Ik supply system, initial ink volume IV, boundary ink volume BV, and residual ink percentage IR are acquired from the target printers 100A, 100B, and 100C in a management process described later. Of the printer information recorded in the management database PD2, the determined status and the boundary number of printing days BD are generated in the management process described later. The reference number of days TD is set according to a reference value setting process described later.

<B-2. Management Process>

A management process according to the second embodiment will be described next. As with the management process of the first embodiment described above, the management process according to the second embodiment is periodically executed for each of the printers 100A, 100B, and 100C under management serving alternately as the processing target printer. The following description covers an example in which the printer 100A is the processing target printer.

Figure 12:
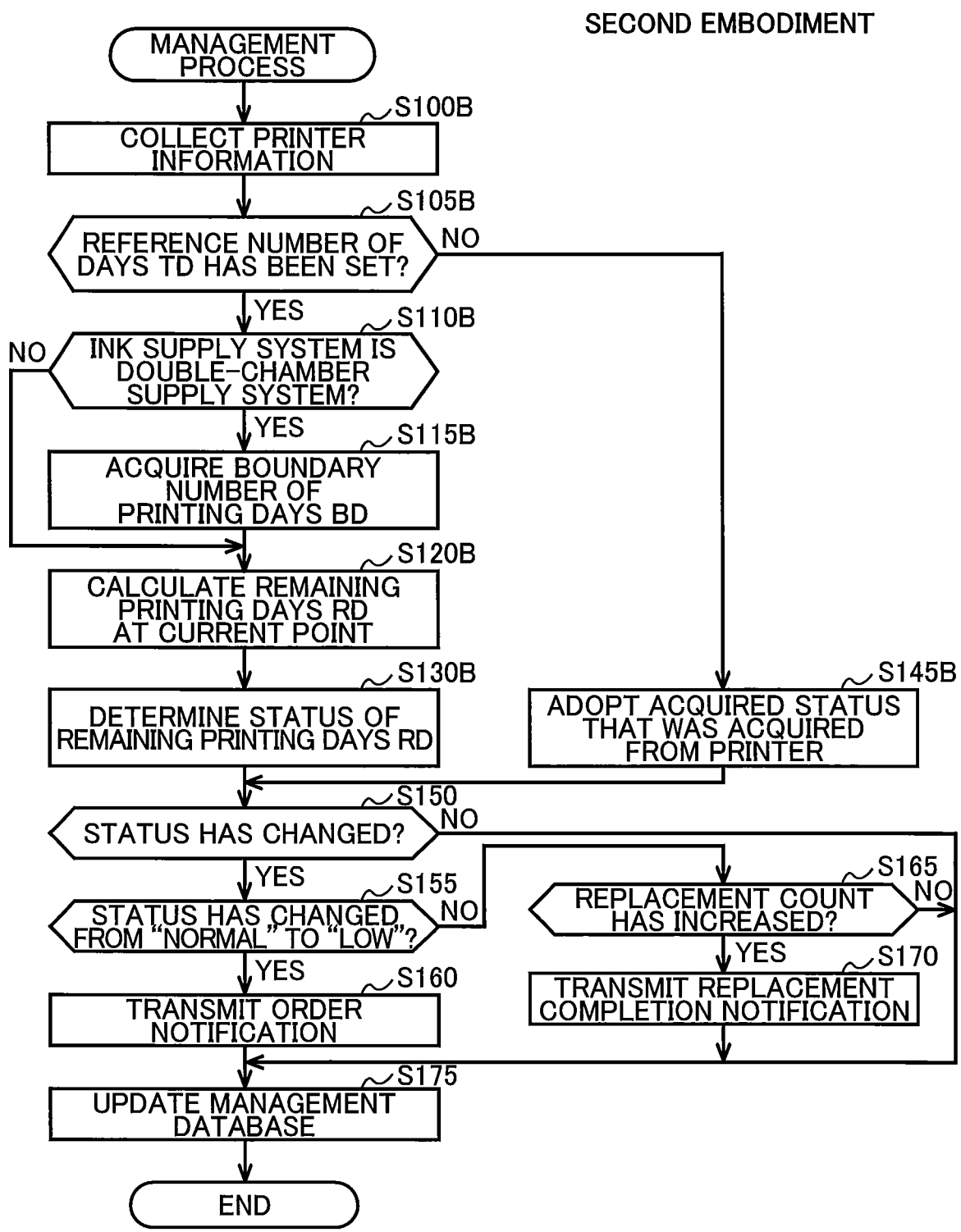
FIG. 12 is a flowchart illustrating steps in a management process performed by the management server according to the second embodiment.

FIG. 12 is a flowchart illustrating steps in the management process according to the second embodiment. Since the steps beginning from S150 in FIG. 12 are the same as those described in the management process of FIG. 5, these steps are designated with the same step numbers to avoid duplicating description. For steps in FIG. 12 prior to S150, a "B" has been appended to the step number used in the management process of FIG. 5. In the management process according to the second embodiment shown in FIG. 12, steps S100B-S145B are executed in place of steps S100-S145 in the management process according to the first embodiment shown in FIG. 5.

In S100B, as in S100 of FIG. 5, the management server 300 collects printer information from the printer 100A, which is the target printer in this example. Printer information is collected using SNMP, as in the first embodiment. The management server 300 records the collected printer information in the volatile storage device 120. As described above, the printer information collected in the second embodiment includes the acquired status, replacement count, replacement day, ink Ik supply system, initial ink volume IV, boundary ink volume BV, and residual ink percentage IR, differing somewhat from the first embodiment.

In S105B the management server 300 determines whether the reference number of days TD has been set for the target printer (the printer 100A in this example). The management server 300 determines that a reference number of days TD has been set when a reference number of days TD is recorded in the management database PD2. The management server 300 advances to S110B when a reference number of days TD has been set (S105B: YES) and advances to S145B when a reference number of days TD has not yet been set (S105B: NO).

In S110B, as in S110 of FIG. 5, the management server 300 determines whether the ink Ik supply system in the target printer is a double-chamber supply system on the basis of information in the collected printer information specifying the ink Ik supply system. When the ink Ik supply system is a double-chamber supply system (S110B: YES), the management server 300 advances to S115B.

In S115B the management server 300 calculates the boundary number of printing days BD according to equation (2) described above using the replacement day, boundary ink volume BV, and residual ink percentage IR acquired in S110B. The boundary number of printing days BD varies depending on a condition of printing executed on the printer 100A (i.e., the condition of ink Ik consumption in the printer 100A). Accordingly, the boundary number of printing days BD is calculated each time the management process is performed.

On the other hand, when the ink Ik supply system is not a double-chamber supply system (S110B: NO), i.e., when the ink Ik supply system is a single-chamber supply system, the management server 300 skips S115B and advances to S120B. In other words, the management server 300 does not calculate the boundary number of printing days BD when the ink Ik supply system of the target printer is a single-chamber supply system (for example, when the target printer is the printer 100C). This is because the print executing unit employing a single-chamber supply system (for example, the print executing unit 170C illustrated in FIG. 3) does not include an intermediate container and thus the concepts of boundary ink volume BV and boundary number of printing days BD do not exist in a single-chamber supply system.

In S120B the management server 300 calculates the remaining printing days RD at the current point in time on the basis of equation (1) described above using the replacement day and residual ink percentage IR acquired in S110B.

In S130B the management server 300 determines the status of the remaining printing days RD on the basis of the remaining printing days RD and the reference number of days TD.

Specifically, if the target printer employs a single-chamber supply system, the management server 300 determines that the status of the remaining printing days RD is "normal" when the remaining printing days RD is greater than the reference number of days TD (RD>TD), and determines that the status is "low" when the remaining printing days RD is less than or equal to the reference number of days TD (RD≤TD).

On the other hand, if the target printer employs a double-chamber supply system, the management server 300 determines that the status of the remaining printing days RD is "normal" when the remaining printing days RD is greater than the sum of the boundary number of printing days BD and reference number of days TD (RD>(BD+TD)) and determines that the status is "low" when the remaining printing days RD is less than or equal to the sum of the boundary number of printing days BD and reference number of days TD (RD≤(BD+TD)).

As described above, the remaining printing days RD is compared with the reference number of days TD for a single-chamber supply system and is compared with the sum of the boundary number of printing days BD and reference number of days TD for a double-chamber supply system. This is because, for a single-chamber supply system, the reference number of days TD is set using as a reference (zero) the state in which the remaining printing days RD is zero, while for a double-chamber supply system, the reference number of days TD is set using as a reference (zero) the state in which the remaining printing days RD is equivalent to the boundary number of printing days BD.

If the reference number of days TD has not yet been set (S105B: NO), in S145B the management server 300 adopts, as the status of the remaining printing days RD, the acquired status acquired in S100 from the printer 100A.

<B-3. Reference Value Setting Process>

In the reference value setting process according to the second embodiment, a reference number of days TD is set, in place of the reference residual percentage TR of the first embodiment, for the target printer as the reference value to be used in the management process described above. According to the reference value setting process according to the second embodiment, in S220 of FIG. 7 the management server 300 calculates, as the boundary index value, a boundary number of printing days BD in place of the boundary residual percentage BR calculated in the first embodiment.

Also in the reference value setting process according to the second embodiment, screen data for a double-chamber supply system is generated in S230 of FIG. 7. However, in the second embodiment, the generated screen data for a double-chamber supply system represents a settings screen WaB (FIG. 13A) different from the settings screens Wa and Wa2 (FIGS. 9A and 9B) in the first embodiment.

Figure 13A:
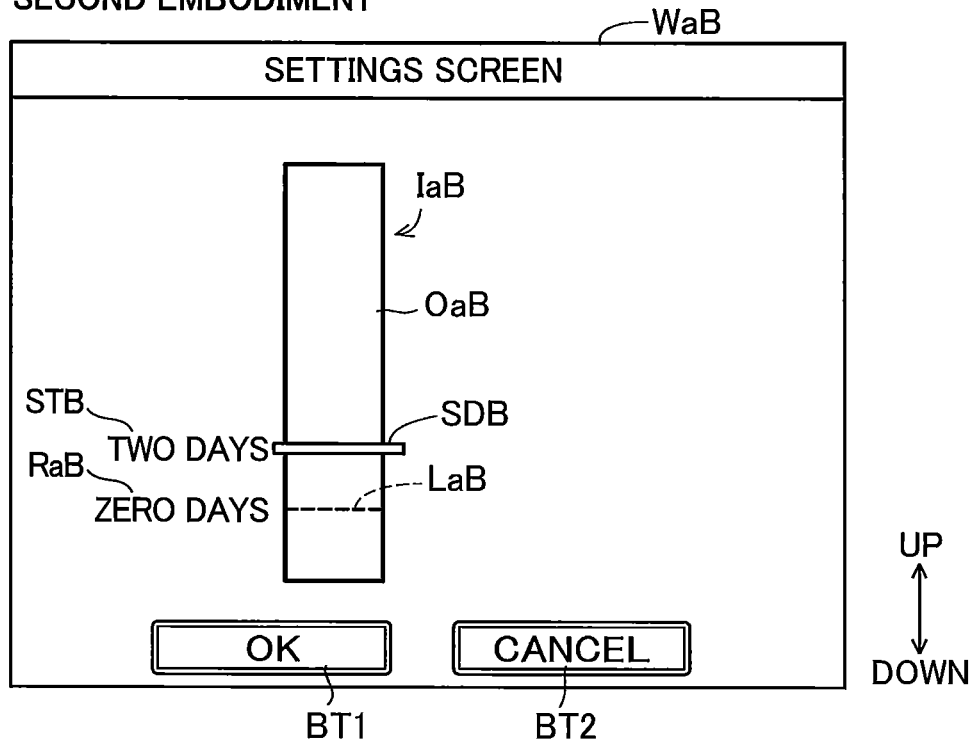
FIG. 13A illustrates an example of a setting screen WaB displayed by the management server according to the second embodiment.
Figure 13B:
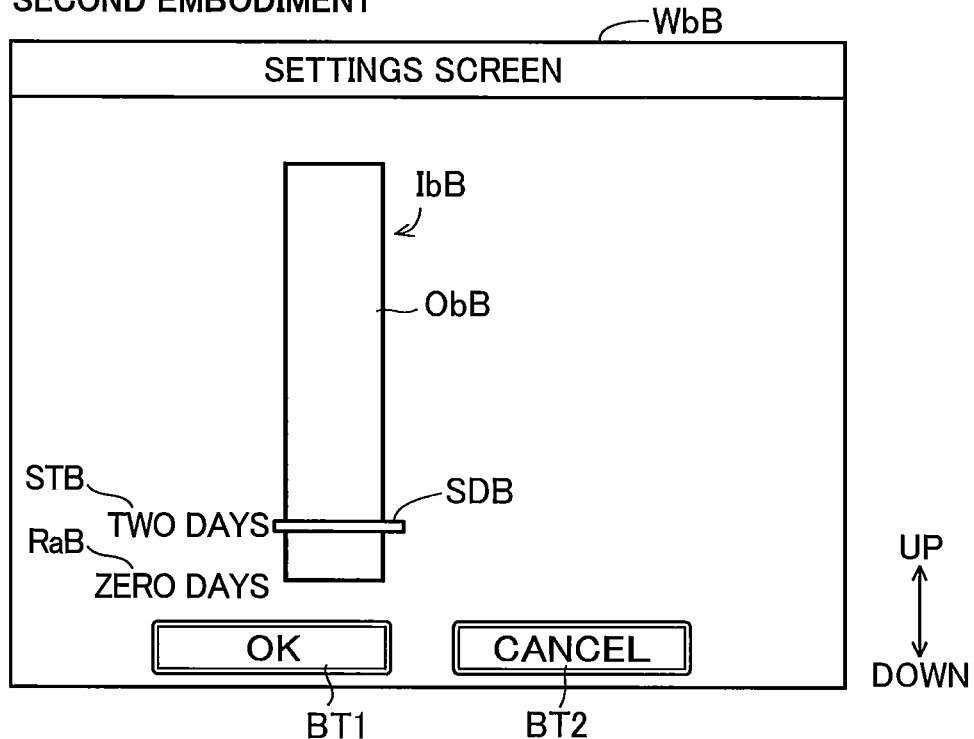
FIG. 13B illustrates an example of a setting screen WbB displayed by the management server according to the second embodiment.

FIGS. 13A and 13B show examples of the settings screens according to the second embodiment. The settings screen WaB shown in FIG. 13A is a screen for acquiring user instructions specifying a desired reference number of days TD (i.e., a user-designated reference number of days TD). This settings screen WaB includes: a UI image IaB enabling the user to input a desired reference number of days TD; an OK button BT1; and a Cancel button BT2.

The UI image IaB includes a bar-shaped object OaB, a slider SDB arranged on the object OaB, and a boundary line LaB arranged on the object OaB.

The object OaB indicates a specific range of possible values for the remaining printing days RD. Specifically, longitudinal (vertical in FIG. 13A) positions along the object OaB correspond to possible values of the remaining printing days RD. The object OaB is an example of the claimed "indication of a specific range of possible values for the index value."

The slider SDB specifies a user-designated reference number of days TD within the specific range represented by the object OaB. As with the slider SD in the first embodiment (FIG. 9), the slider SDB is moved over the object OaB along the longitudinal direction thereof in response to move commands by the user. By moving the slider SDB, the user can adjust (change) the reference number of days TD. Text STB ("2 days" in the example of FIG. 13A) displayed in the vicinity of the slider SDB specifies the reference number of days TD corresponding to the position of the slider SDB. Each of the slider SDB and the text STB is an example of the claimed "indication of a value designated from the specific range as the reference value by the user instruction."

The boundary line LaB denotes the boundary number of printing days BD calculated in S220 of FIG. 7. The boundary line LaB is arranged at a position in the longitudinal direction of the object OaB corresponding to the boundary number of printing days BD. As described above, the reference number of days TD for a double-chamber supply system is set using as reference (zero) the state in which the remaining printing days RD is equivalent to the boundary number of printing days BD. Accordingly, text RaB representing "0 days" is displayed near the boundary line LaB. Each of the boundary line LaB and the text RaB is an example of the claimed "indication of a boundary value."

Also in the reference value setting process of the second embodiment, in S240 of FIG. 7, the management server 300 executes the settings screen display process in FIG. 8 for a double-chamber supply system. However, in the second embodiment, in S350 of FIG. 8 the management server 300 updates the text STB of the reference number of days TD corresponding to the position of the slider SDB. Further, in S390 of FIG. 8 the management server 300 acquires the reference number of days TD corresponding to the acquired position of the slider SDB.

Also in the reference value setting process according to the second embodiment, In S250 of FIG. 7 the management server 300 generates screen data for a single-chamber supply system. However, in the second embodiment a settings screen WbB (FIG. 13B) represented by the screen data for a single-chamber supply system differs from the settings screen Wb (FIG. 9C) in the first embodiment. FIG. 13B shows an example of the settings screen WbB. The settings screen WbB includes a UI image IbB that enables the user to input a desired reference number of days TD, an OK button BT1, and a Cancel button BT2.

The UI image IbB includes a bar-shaped object ObB, and a slider SDB arranged on the object ObB.

The object ObB indicates a specific range of possible values for the remaining printing days RD, and positions along the longitudinal direction of the object ObB correspond to possible values for the remaining printing days RD. As described above, the reference number of days TD for a single-chamber supply system is set using as a reference (zero) the state in which the remaining printing days RD is zero. Accordingly, text RaB representing "0 days" is displayed near the bottom end of the object ObB.

Also in the settings screen WbB, the user can adjust (change) the reference number of days TD by moving the slider SDB. As in the settings screen WaB, text STB ("2 days" in the example of FIG. 13B) specifying the reference number of days TD corresponding to the position of the slider SDB is displayed in the settings screen WbB in the vicinity of the slider SDB.

Here, the concept of boundary number of printing days BD does not exist in a single-chamber supply system since the system does not include an intermediate container. Accordingly, a boundary line LaB corresponding to the boundary number of printing days BD is not included in the settings screen WbB.

Also in the reference value setting process according to the second embodiment, in S260 of FIG. 7 the management server 300 executes a settings screen display process for a single-chamber supply system using the screen data for a single-chamber supply system generated in S250. In this settings screen display process, the management server 300 displays the settings screen WbB on the display unit 340 and acquires, from the user via the settings screen WbB, a new reference number of days TD to be set.

In the settings screen display process for a single-chamber supply system according to the second embodiment, the determination process of S330 in FIG. 8 is not executed since the settings screen WbB does not include a boundary line LaB. All other steps in the settings screen display process for a single-chamber supply system are identical to those in the settings screen display process for a double-chamber supply system shown in FIG. 8.

In the second embodiment described above, the remaining printing days RD is used, in addition to the residual ink percentage IR, as the index value for the total residual ink quantity, and the remaining printing days RD corresponding to the boundary between the first storage state S1 and second storage state S2 is used as the boundary index value. Since a reference number of days TD is set for the remaining printing days RD, the user can easily set a suitable reference number of days TD. For example, the user can easily set a suitable reference number of days TD while considering the number of days required for a new ink cartridge 200A to reach the location of the printer 100A after an order notification for the ink cartridge 200A is transmitted.

Here, the boundary residual percentage BR in the first embodiment changes depending on the initial ink volume IB and the boundary ink volume BV. However, the boundary residual percentage BR does not change unless the initial ink volume IV changes. This is because the boundary ink volume BV is a value dependent on the structure of the intermediate container (the intermediate container 175A, for example) and, hence, is a single fixed value for each printer.

On the other hand, the boundary number of printing days BD in the second embodiment is dependent on not only the initial ink volume IB and boundary ink volume BV but also a print execution condition on the printer 100A, and specifically the condition of consumed ink Ik in the printer 100A. Accordingly, the boundary number of printing days BD changes according to the condition of consumed ink Ik in the printer 100A. For example, if the printing frequency on the printer 100A decreases, causing the rate of ink Ik consumption to drop, the boundary number of printing days BD will increase.

In the second embodiment, the management server 300 acquires the residual ink percentage IR periodically from the printers 100A and 100B having double-chamber supply systems (S100B in FIG. 12). When a reference number of days TD has been set (S115: YES in FIG. 12), the management server 300 uses the residual ink percentage IR to update the boundary number of printing days BD recorded in the management database PD2 each time a residual ink percentage IR is acquired (S115B and S175 in FIG. 12). Thus, the management server 300 can use a boundary number of printing days BD that accurately reflects the condition of consumed ink Ik in the printer 100A to display a boundary line LaB corresponding to the boundary number of printing days BD at a suitable position on the object OaB in the settings screen WaB.

As described above, the residual ink percentage IR in the second embodiment is an example of the printing agent information related to the residual quantity of printing agent, the remaining printing days RD is an example of the index value for the residual quantity of printing agent, the boundary number of printing days BD is an example of the boundary index value, and the reference number of days TD is an example of the reference value.

C. Modifications of the Embodiments

While the descriptions have been made in detail with reference to the specific embodiments, it would be apparent to those skilled in the art that many modifications and variations may be made thereto. In the following description, various modifications of the embodiments will be described while focusing on differences between each modification and the above-described embodiments.

Figure 14A:
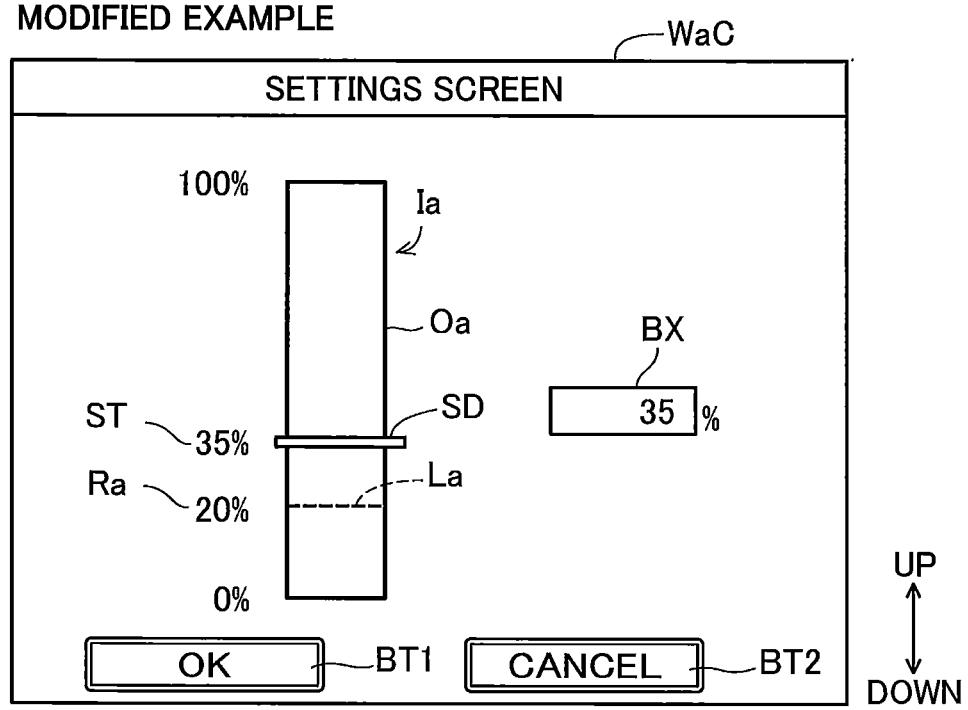
FIG. 14A illustrates an example of a setting screen WaC displayed by a management server according to a modification of the above embodiments.
Figure 14B:
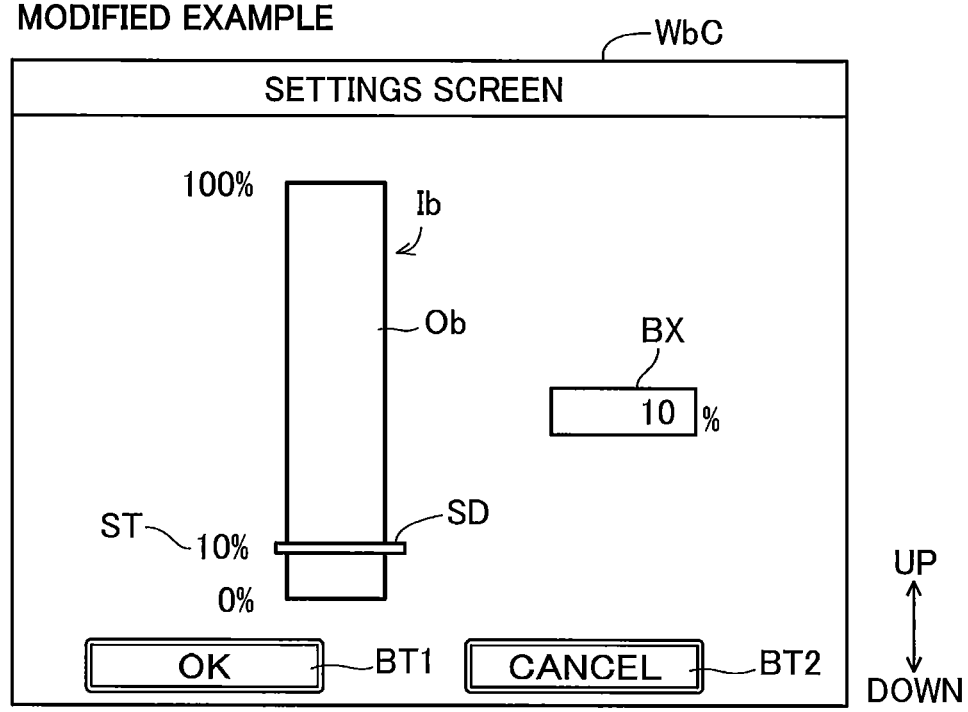
FIG. 14B illustrates an example of a setting screen WbC displayed by the management server according to the modification.

(1) The settings screens Wa, Wa2, Wb, and WbB in the embodiments described above (see FIGS. 9A, 9B, 9C, 13A and 13B) are merely examples and may be modified as needed. FIGS. 14A and 14B show variations of the settings screens. Settings screens WaC and WbC in FIGS. 14A and 14B differ from the settings screens Wa and Wb in FIGS. 9A and 9C with the inclusion of a box BX for inputting a desired reference residual percentage TR. The user can input instructions specifying a desired reference residual percentage TR in the settings screens WaC and WbC by inputting a numerical value in the box BX instead by operating the slider SD. The remaining configurations of the settings screens WaC and WbC in FIGS. 14A and 14B are identical to the settings screens Wa and Wb in FIGS. 9A and 9C.

In addition, a line that is not operated by the user may be displayed in the settings screens WaC and WbC in place of the slider SD. This line may be moved in accordance with the value inputted into the box BX, for example.

(2) In the settings screen display process for a double-chamber supply system according to the first embodiment described above, the management server 300 prevents the user from inputting instructions specifying a reference residual percentage TR less than the boundary residual percentage BR by prohibiting the slider SD from being moved to the region below the boundary line La corresponding to the boundary residual percentage BR. However, when employing the settings screen WaC shown in FIG. 14A, if the user inputs a numerical value less than the boundary residual percentage BR in the box BX, the management server 300 may display the numerical value of the boundary residual percentage BR in the box BX and a message indicating that a numerical value less than the boundary residual percentage BR cannot be inputted. This configuration also can prohibit the user from inputting instructions specifying a reference residual percentage TR less than the boundary residual percentage BR.

(3) The settings screen Wa in the first embodiment includes a single UI image Ia corresponding to the printer 100A selected as the processing target. However, the management server 300 may display a settings screen that includes a plurality of UI images corresponding to a plurality of printers selected as processing targets. This same variation may be applied to the settings screens Wa2, WaB, Wb, and WbB.

(4) The printer 100A used as an example of the processing target printer in the embodiments described above is provided with a monochromatic printing mechanism 171A employing a single ink color (black (K), for example). However, the printer 100A may be provided with a printing mechanism using multiple colors of ink, such as a printing mechanism capable of printing color images using the four colors of ink; cyan (C), magenta (M), yellow (Y), and black (K). In this case, four ink cartridges 200A corresponding to the four colors of ink can be attached to the print executing unit 170A of the printer 100A. In the print executing unit 170A according to this variation, the attachment portion 172A, ink supply opening 174A, intermediate container 175A, and ink channel section 177A are provided for each of the four ink colors. The management database PD records, in each entry, four records of ink-related information corresponding to the four ink colors. Here, the management process of FIG. 5 and the reference value setting process of FIG. 7 may be executed independently for each of the four ink cartridges 200A in a single printer 100A. Further, the settings screen Wa may include four UI images Ia corresponding to the four ink cartridges 200A. This configuration may also be applied to the settings screens Wa2, Wab, Wb, and WbB.

(5) The printer 100A used as an example of the target printer in the present embodiment is provided with an inkjet-type print executing unit 170A. However, the printer 100A may instead be provided with a printing mechanism employing an electrophotographic system (laser system, for example) for printing images using toner as the printing agent. In this case, the print executing unit may be provided with an attachment portion to which a toner cartridge is attachable, a printing mechanism that executes printing operations using the toner accommodated in the toner cartridge attached to the attachment portion, and a container (a subtank for temporarily storing toner, for example) disposed along the path that toner travels from the toner cartridge attached to the attachment portion to the printing mechanism. The management process and reference value setting process described in the embodiments can also be applied to this type of printer provided with a double-chamber supply system for supplying toner.

(6) In the present embodiments described above, when the management server 300 determines that the replenishment condition has been met (S150 and S155 of FIG. 5), the management server 300 sends an order notification (S160 of FIG. 5). As an alternative, the management server 300 may transmit the user-designated reference residual percentage TR to the printer 100A, and the printer 100A may determine whether the replenishment condition is met and may transmit an order notification to the vendor server 400 when the replenishment condition has been met. As another variation, the printer 100A may determine whether the replenishment condition has been met and, when the condition has been met, may transmit information to the management server 300 indicating that the replenishment condition has been met. In this case, the management server 300 transmits an order notification to the vendor server 400 after receiving information from the printer 100A specifying that the replenishment condition has been met. Since the management server 300 does not determine whether the replenishment condition is met in this variation, the management server 300 need not acquire the residual ink percentage IR and the acquired status from the printer 100A.

(7) In the first embodiment described above, the management server 300 acquires the initial ink volume IV and boundary ink volume BV from the printer 100A (S100 of FIG. 5) and calculates the boundary residual percentage BR (S220 of FIG. 7). However, the boundary residual percentage BR may be calculated on the printer 100A, and the management server 300 may acquire the boundary residual percentage BR from the printer 100A.

In the second embodiment, the management server 300 acquires the replacement day, boundary ink volume BV, and residual ink percentage IR from the printer 100A (S100B of FIG. 12) and calculates the boundary number of printing days BD (S220 of FIG. 7). However, the boundary number of printing days BD may be calculated on the printer 100A, and the management server 300 may acquire the boundary number of printing days BD from the printer 100A.

(8) In the embodiments described above, the management server 300 displays a boundary line La or LaB that specify the boundary index value (the boundary residual percentage BR or the boundary number of printing days BD) on the settings screen Wa or WaB for the double-chamber supply system (FIG. 9A and FIG. 13A), and prohibits the user from inputting a command specifying a reference value (the reference residual percentage TR or reference number of days TD) smaller than the boundary index value. As a variation, the management server 300 may execute just one of: the processes to display the boundary line La or boundary line LaB specifying the boundary index value on the settings screen Wa or WaB for the double-chamber supply system; and the process for prohibiting the user from inputting a command specifying a reference value less than the boundary index value. Execution of at least one of these processes enables a suitable reference value to be set.

(9) In the embodiments described above, ink Ik is replenished in the printer 100A by replacing the ink cartridge 200A. However, if the cartridge is a specific type cartridge that can be refilled with printing agent supplied from a prescribed bottle, for example, the printer may be replenished with printing agent by refilling the cartridge with the printing agent rather than by replacing the cartridge.

(10) In the embodiments described above, the reference value setting process of FIG. 7 is executed when the user inputs a start request via the sub-window SW displayed on the display unit 340. As a variation, the reference value setting process may be executed when a start request is transmitted from the user's terminal device (smartphone, for example) to the management server 300. Alternatively, if a new printer to be managed is detected by the management server 300 when the computer program PG2 is started up, the management server 300 may automatically execute the reference value setting process even though a start request has not been received.

(11) In the embodiments described above, outputting screen data by the management server 300 is performed in a manner that the management server 300 displays a settings screen (the settings screen Wa in FIG. 9A, for example) on the display unit 340 using the screen data. However, in a case where the reference value setting process is executed in response to a start request from a user terminal device, for example, outputting screen data by the management server 300 may be performed in a manner that the management server 300 transmits the screen data to the user's terminal device. In this case, the settings screen is displayed on a display of the terminal device, for example, and the terminal device acquires the user-designated reference residual percentage TR or reference number of days TD through the settings screen on the display. Subsequently, the terminal device transmits the acquired reference residual percentage TR or acquired reference number of days TD to the management server 300.

(12) In the embodiments described above, the management server 300 executes the management process in FIGS. 5 and 12 and the reference value setting process in FIG. 7. However, these processes may be executed by each of the printers, such as the printer 100A (the CPU 110).

In this case, in S100 of the management process in FIG. 5, for example, the printer 100A collects printer information from its own print executing unit 170A and in S175 updates its own information database IB. Further, in S240 and S260 in the reference value setting process of FIG. 7, the printer 100A displays the settings screen Wa or Wb on its own display unit 140. The printer 100A in this variation is an example of the claimed "information-processing apparatus." The CPU 110 in this variation is an example of the claimed "controller."

(13) In the embodiments described above, the management server 300 transmits an order notification to the vendor server 400 (S160 of FIGS. 5 and 12) when the replenishment condition is met. Alternatively, when the replenishment condition has been met, the management server 300 may display a notification on the display unit 340 prompting the user to replace the ink cartridge 200A. As another variation, when the replenishment condition has been met, the management server 300 may transmit, to the email address of the user, a notification prompting the user to replace the ink cartridge 200A. In other words, it is preferable that, when the replenishment condition has been met, the user is notified of information triggering replenishment of printing agent, such as the ink Ik.

(14) While the management server 300 is connected to the local area network NT in the above-described embodiments, the management server 300 may be connected to the Internet IT instead. In this case, for example, the printers 100A, 100B, and 100C periodically and voluntarily transmit printer information to the management server 300 via the local area network NT and the Internet IT. The management server 300 uses this printer information to execute the management process in FIG. 5 or 12. Subsequently, the management server 300 executes the reference value setting process in FIG. 7 in response to a start request received via the Internet IT from the user's terminal device. In this case, the management server 300 may be a so-called cloud server, for example, that includes a plurality of computers capable of communicating with each other over a network.

(15) In the first embodiments, the object Oa represents the specific range for possible values for the residual ink percentages IR, i.e., the range from 0% to 100%. Alternatively, the object Oa may represent a second specific range within the entire range of possible residual ink percentages IR. The second specific range is a range ranging from the boundary ink percentage IR to the maximum value (more than 100%) for the residual ink percentage IR. In this case, the upper end of the object Oa corresponds to the maximum value (more than 100%) for the residual ink percentage IR, while the bottom end of the object Oa corresponds to the boundary ink percentage IR. This arrangement also can prevent the user from designating, as the reference residual ink percentage TR, a value less than the boundary ink percentage BR. Note that, in this variation, the maximum value of the second specific range need not necessarily be the maximum value of the entire range for possible residual ink percentages IR but may be any value that is within the entire range and greater than the boundary ink percentage BR.

(16) In the embodiments described above, part of the configuration implemented in hardware may be replaced with software and, conversely, all or part of the configuration implemented in software may be replaced with hardware.

(17) When all or some of the functions of the present disclosure are implemented with computer programs, the programs may be provided in a state where the programs are stored on a computer-readable storage medium (a non-transitory storage medium, for example). The programs may be used in a state where the programs are stored in the same storage medium (a computer-readable storage medium) as that at the time of provision. Alternatively, the programs may be used in a state where the programs are stored in a storage medium (a computer-readable storage medium) different from that at the time of provision. The "computer-readable storage medium" may be a portable storage medium, such as a memory card or CD-ROM; an internal storage device built into the computer, such as any of various ROM or the like; or an external storage device, such as a hard disk drive, connected to the computer.

What is claimed is:

1. An information-processing apparatus for managing a print executing unit, the print executing unit including: an attachment portion to which a cartridge storing printing agent is attachable; a container for receiving the printing agent from the cartridge attached to the attachment portion and storing the received printing agent; and a printing mechanism configured to perform printing operations using the printing agent stored in the container, the information-processing apparatus comprising a controller configured to perform:
(a) generating screen data representing a settings screen, the settings screen being for setting a reference value on the basis of a user instruction, the reference value and an index value for a total residual quantity being compared with each other to determine whether a replenishment condition is met, the total residual quantity being a total quantity of a first residual quantity and a second residual quantity, the first residual quantity being a quantity of printing agent remaining in the cartridge, the second residual quantity being a quantity of printing agent remaining in the container, a notification triggering replenishment of the print executing unit with printing agent is made when the replenishment condition is met; and
(b) outputting the generated screen data,
wherein the settings screen includes:
an indication of a specific range of possible values for the index value;
an indication of a value designated from the specific range as the reference value by the user instruction; and
an indication of a boundary value, the boundary value being a value within the specific range and corresponding to a boundary quantity, the boundary quantity being the total residual quantity at a time of transition from a first state to a second state, the first state being a state in which the printing agent remains both in the cartridge and in the container, the second state being a state in which the printing agent vanishes from the cartridge but remains in the container.

2. The information-processing apparatus according to claim 1, wherein the user instruction is inputted by a user designation operation on the settings screen, the user designation operation being a user operation to designate a value as the reference value, and
wherein the controller is configured to further perform:
(c) determining whether the user designation operation is an inappropriate operation, the inappropriate operation being a user operation to designate as the reference value a value from a prohibited range included in the specific range, the prohibited range corresponding to a residual quantity range ranging less than the boundary quantity;
(d) accepting, in response to determining that the user designation operation is not the inappropriate operation, input of the user instruction by the user designation operation; and
(e) refusing, in response to determining that the user designation operation is the inappropriate instruction, input of the user instruction by the user designation operation.

3. The information-processing apparatus according to claim 1, wherein, when the total residual quantity to which the index value corresponds is less than or equal to a residual quantity corresponding to the reference value, the replenishment condition is determined to be met.

4. The information-processing apparatus according to claim 1, wherein the index value is a ratio of the total residual quantity to an initial quantity of the printing agent stored in the cartridge, and
wherein the boundary value is a ratio of the boundary quantity to the initial quantity.

5. The information-processing apparatus according to claim 4, wherein, in a case where the initial quantity is a first quantity, the indication of the boundary value is an indication of a first ratio, the first ratio being a ratio of the boundary quantity to the first quantity,
wherein, in a case where the initial quantity is a second quantity which is greater than the first quantity, the indication of the boundary value is an indication of a second ratio, the second ratio being a ratio of the boundary quantity to the second quantity, and
wherein the second ratio is smaller than the first ratio.

6. The information-processing apparatus according to claim 4, wherein the controller is configured to further perform:
(f) calculating, in response to the cartridge attached to the attachment portion being replaced with another cartridge whose initial quantity of printing agent is different from that of the cartridge, the boundary value on the basis of the initial quantity of the another cartridge;
(g) determining whether a value set as the reference value prior to the replacement is less than the calculated boundary value; and
(h) setting, in response to determining that the value set as the reference value is less than the calculated boundary value, the reference value to a value greater than or equal to the calculated boundary value.

7. The information-processing apparatus according to claim 1, wherein the index value is a remaining printing period of time for which the print executing unit can perform printing operations using the total residual quantity of the printing agent without the print executing unit being replenished with printing agent,
wherein the boundary value is a remaining printing period of time for which the print executing unit can perform printing operations using the boundary quantity of the printing agent without the print executing unit being replenished with printing agent, and wherein the controller is configured to further perform:
(i) acquiring, each time a specific condition is met, printing agent information about the total residual quantity of the printing agent; and
(j) updating, each time performing the (i) acquiring, the boundary value using the acquired printing agent information.

8. The information-processing apparatus according to claim 1, wherein the (a) generating is performed in response to the controller acquiring a request to output the screen data.

9. The information-processing apparatus according to claim 1, wherein the cartridge is formed with a first storage chamber for accommodating therein the printing agent, the first storage chamber being communicated with an outside of the cartridge,
wherein the container is formed with a second storage chamber for accommodating therein the printing agent, the second storage chamber being communicated with an outside of the container and having a specific portion positioned below a lower end in a vertical direction of the first storage chamber, and
wherein the boundary quantity is equivalent to the capacity of the specific portion.

10. The information-processing apparatus according to claim 1, further comprising:
a communication interface for communicating with both of a first printer and a second printer each of which includes the print executing unit,
wherein the controller is configured to further perform:
(k) acquiring, from the first printer, first printing agent information about the total residual quantity of the printing agent for the first printer; and
(l) acquiring, from the second printer, second printing agent information about the total residual quantity of the printing agent for the second printer, and
wherein the (a) generating is performed for each of the first printer and the second printer, the (a) generating for the first printer being performed using the acquired first printing agent information to thereby generate the screen data for the first printer, the (a) generating for the second printer being performed using the acquired second printing agent information to thereby generate the screen data for the second printer.

11. A non-transitory computer-readable storage medium storing a set of program instructions for an information-processing apparatus for managing a print executing unit, the print executing unit including: an attachment portion to which a cartridge storing printing agent is attachable; a container for receiving the printing agent from the cartridge attached to the attachment portion and storing the received printing agent; and a printing mechanism configured to perform printing operations using the printing agent stored in the container, the information-processing apparatus comprising a processor, the set of program instructions, when executed by the processor, causing the information-processing apparatus to perform:
(a) generating screen data representing a settings screen, the settings screen being for setting a reference value on the basis of a user instruction, the reference value and an index value for a total residual quantity being compared with each other to determine whether a replenishment condition is met, the total residual quantity being a total quantity of a first residual quantity and a second residual quantity, the first residual quantity being a quantity of printing agent remaining in the cartridge, the second residual quantity being a quantity of printing agent remaining in the container, a notification triggering replenishment of the print executing unit with printing agent being made when the replenishment condition is met; and
(b) outputting the generated screen data,
wherein the settings screen includes:
an indication of a specific range of possible values for the index value;
an indication of a value designated from the specific range as the reference value by the user instruction; and
an indication of a boundary value, the boundary value being a value within the specific range and corresponding to a boundary quantity, the boundary quantity being the total residual quantity at a time of transition from a first state to a second state, the first state being a state in which the printing agent remains both in the cartridge and in the container, the second state being a state in which the printing agent vanishes from the cartridge but remains in the container.

* * * * *